(12) United States Patent
Strömqvist et al.

(10) Patent No.: US 12,044,693 B2
(45) Date of Patent: Jul. 23, 2024

(54) LIQUID HANDLING MEANS FOR PERFORMING ASSAYS USING PLATE-LIKE LIQUID CONTACTING MEANS WITH FORCE CONTROLLING ELEMENT

(71) Applicant: Single Technologies AB, Stockholm (SE)

(72) Inventors: Johan Strömqvist, Stockholm (SE); Bengt Sahlgren, Stockholm (SE); Nils Tingstam, Stockholm (SE)

(73) Assignee: Single Technologies AB, Stockholm (SE)

( * ) Notice: Subject to any disclaimer, the term of this patent is extended or adjusted under 35 U.S.C. 154(b) by 0 days.

(21) Appl. No.: 18/548,794

(22) PCT Filed: Feb. 28, 2022

(86) PCT No.: PCT/EP2022/054978
§ 371 (c)(1),
(2) Date: Sep. 1, 2023

(87) PCT Pub. No.: WO2022/184636
PCT Pub. Date: Sep. 9, 2022

(65) Prior Publication Data
US 2024/0168049 A1    May 23, 2024

(30) Foreign Application Priority Data
Mar. 1, 2021 (EP) .................................. 21159928

(51) Int. Cl.
*G01N 35/10* (2006.01)
*B01J 19/12* (2006.01)
(Continued)

(52) U.S. Cl.
CPC ........ *G01N 35/1016* (2013.01); *B01J 19/127* (2013.01); *B05C 1/0813* (2013.01);
(Continued)

(58) Field of Classification Search
CPC ... G01N 2001/2007; G01N 2011/1014; G01N 1/20; G01N 1/00; G01N 2021/754;
(Continued)

(56) References Cited

U.S. PATENT DOCUMENTS 3,273,536 A     9/1966  Galer et al.
3,991,708 A  *  11/1976  Huebschmann ...... B05C 1/0813
                                                118/247
(Continued)

FOREIGN PATENT DOCUMENTS

CN      101520454 A     9/2009
EP        2711088 B1    1/2020
(Continued)

OTHER PUBLICATIONS

International Search Report and Written Opinion for PCT Application No. PCT/EP2022/054978, mailed on Apr. 26, 2022, 18 pages.
(Continued)

*Primary Examiner* — Michael P LaPage
(74) *Attorney, Agent, or Firm* — Brake Hughes Bellermann LLP

(57) ABSTRACT

The present invention relates to an apparatus for conducting assays on samples and/or processing of samples. The apparatus comprises a rotatably arranged cylindrical sample holder for holding a sample at a lateral surface of the cylindrical sample holder. The cylindrical sample holder is configured to be at least partly covered by a liquid layer. The apparatus further comprises a liquid dispensing means configured to add liquid to the liquid layer, a reagent dispensing means configured to add a reagent to the liquid layer and a liquid contacting means configured to distribute liquid within said liquid layer. The liquid contacting means comprises a plate-like element flexibly assembled in relation to the cylindrical sample holder. The present invention also
(Continued)

relates to a method for conducting assays on samples and/or processing of samples.

16 Claims, 10 Drawing Sheets

(51) Int. Cl.
    *B05C 1/08*         (2006.01)
    *B05C 11/02*      (2006.01)
    *G01N 21/03*      (2006.01)
    *G01N 21/51*      (2006.01)

(52) U.S. Cl.
    CPC ............ *B05C 11/028* (2013.01); *G01N 21/03* (2013.01); *G01N 2021/0325* (2013.01); *G01N 2021/0378* (2013.01); *G01N 2021/513* (2013.01)

(58) Field of Classification Search
    CPC ....... G01N 2021/757; G01N 2021/845; G01N 2035/0443; G01N 35/1016; G01N 21/03; G01N 2021/0325; G01N 2021/0378; G01N 2021/513; B05C 1/0813; B05C 11/028; B01J 19/127

See application file for complete search history.

(56) References Cited

U.S. PATENT DOCUMENTS

| | | | | | |
|---|---|---|---|---|---|
| 4,558,658 | A | * | 12/1985 | Sommer | ............... B05C 11/023 118/411 |
| 5,611,860 | A | * | 3/1997 | Waech | ................... D21H 23/36 118/410 |
| 5,665,163 | A | * | 9/1997 | Li | ........................... D21H 23/60 118/409 |
| 5,882,406 | A | * | 3/1999 | Becker | .................. B05C 1/0813 118/410 |
| 6,024,797 | A | * | 2/2000 | Li | .............................. B05C 3/18 118/413 |
| 6,565,752 | B1 | | 5/2003 | Baron et al. | |
| 2017/0001165 | A1 | * | 1/2017 | Crnogorac | ............. B05D 1/005 |
| 2018/0320314 | A1 | | 11/2018 | Gaspari et al. | |
| 2019/0049382 | A1 | * | 2/2019 | Stubbe | ................. G02B 27/141 |

FOREIGN PATENT DOCUMENTS

| | | |
|---|---|---|
| JP | 2012239930 A | 12/2012 |
| JP | 2017525982 A | 9/2017 |
| JP | 2019508691 A | 3/2019 |
| WO | 2009099512 A2 | 8/2009 |
| WO | 2017144619 A1 | 8/2017 |

OTHER PUBLICATIONS

Jayawardena, K. D. G. I., et al., "Solution Processed Perovskite Incorporated Tandem Photovoltaics: Developments, Manufacturing, and Challenges", Journal of Materials Chemistry C, vol. 8, No. 31, Aug. 13, 2020, pp. 10641-10675.

* cited by examiner

LIQUID HANDLING MEANS FOR PERFORMING ASSAYS USING PLATE-LIKE LIQUID CONTACTING MEANS WITH FORCE CONTROLLING ELEMENT

CROSS REFERENCE TO RELATED APPLICATIONS

This application is a 35 U.S.C. § 371 National Phase Entry Application from PCT Application No. PCT/EP2022/054978, filed on Feb. 28, 2022, entitled "LIQUID HANDLING MEANS FOR PERFORMING ASSAYS", and designating the U.S., which in turn claims priority to EP Application No. 21159928.7 filed on Mar. 1, 2021, the disclosures of which are incorporated by reference herein in their entireties.

TECHNICAL FIELD

The present invention relates to an apparatus for conducting assays on samples and/or processing of samples; and a method for conducting assays on samples and/or processing of samples.

BACKGROUND

The advances the last decades in the fields of "omics", e.g., genomics, transcriptomics, proteomics and metabolomics, have significantly contributed to the understanding of human and non-human biology and diseases. The capability to massively parallelize biochemical assays has given the research community access to unprecedented amounts of information. Using this data for statistics and big data analysis has made new discoveries possible and opened for a plethora of applications in diverse fields, for example cancer research. The quest for even larger amounts of biologically relevant data thus drives the development of high throughput "omics" technologies. To enable wider adoption in research and paving the way for these techniques to be practiced by the clinical community, it's highly desirable both to increase the number of "omics" experiments that can be performed in an assay and to drive down the cost per assay.

When performing massively parallelized assays, e.g. in next generation DNA sequencing (NGS), the chemistry and imaging steps in the protocol are typically repeated many times. A single cycle may for example involve flushing of samples of immobilized single strands of DNA with a solution (or reaction medium) of nucleotides equipped with fluorophores, a second flushing operation to remove excess nucleotides, and an imaging step to measure the fluorescence and determine which nucleotide (if any) was incorporated on the strand. These operations or steps are then repeated over and over until the sequence is established. The throughput may be limited either by the lead times of the flushing steps (adding reactants and/or removing excess reactants or other free flowing reaction products), or by the data acquisition time, i.e. the time required to collect the data from all samples of immobilized single strands of DNA. Although there exist NGS sequencing systems capable of performing fast data acquisition, there is a need in the art for improved liquid handling systems for use in e.g. NGS applications.

SUMMARY OF THE INVENTION

The following documents are incorporated by reference into this disclosure as if fully set forth herein: WO2016/030464 and WO2017/144619.

It is an object of the present disclosure to alleviate at least some of the drawbacks associated with the prior art techniques for performing biochemical assays.

In a first aspect of the inventive concept, there is provided an apparatus for conducting assays on samples and/or processing of samples, said apparatus comprising:
- a cylindrical sample holder for holding a sample at a lateral surface of the cylindrical sample holder, wherein said cylindrical sample holder is rotatably arranged; wherein said cylindrical sample holder is configured to be at least partly covered by a liquid layer;
- a liquid dispensing means configured to add liquid to the liquid layer;
- a reagent dispensing means configured to add a reagent to the liquid layer;
- a liquid contacting means configured to distribute liquid within said liquid layer, wherein said liquid contacting means comprises a plate-like element flexibly assembled in relation to the cylindrical sample holder.

The apparatus may further comprise a liquid removal means configured to remove liquid from the liquid layer. The liquid removal means may at least partly be comprised within the liquid contacting means. In other embodiments the liquid removal means may be provided as a separate structure. Alternatively, the apparatus does not contain any liquid removal means. Instead, liquid may be removed by letting liquid from the sample holder while rotation is stopped or when a rotation speed of the sample holder is reduced.

As mentioned above, it is an object of the present disclosure to provide an apparatus capable of rapidly regulating the chemical composition and properties of said liquid layer. Stated differently, to provide an apparatus capable of providing a specific reactant to be present in said liquid layer at a given time and/or position on the sample holder. In said properties are also included the ability to change and control the concentration of said reactants, the local temperature of said liquid layer, and the pH of said liquid layer. It was realized that said rapid regulation of the composition and properties of the liquid layer acting as a reaction medium, needs to involve the ability to regulate the amount of liquid in the liquid layer by at times adding liquid to the sample holder and at times displacing liquid on said sample holder and at times removing liquid from said sample holder.

Herein, the term "liquid layer" refers to a liquid present on the lateral surface of the sample holder. The term "lateral surface" should be given its normal interpretation, i.e. it refers to the sides of the cylindrical sample holder excluding base and top surfaces. The liquid will thus cover at least a portion of the surface of the sample holder, preferably substantially all of the surface of the sample holder. The liquid covering the sample holder will thus form a liquid layer, with a liquid layer thickness being defined as the height of said layer at a specific position on the sample holder. During rotation of the sample holder, a uniform liquid layer can be formed on the sample holder. A uniform liquid layer thickness is a thickness that is substantially constant around a circumference of the cylindrical sample holder. Uniform thickness may in this context mean a variation in thickness of less than 20% around the circumference, such as less than 15%, such as less than 10%, such as less than 5%. Preferably, the liquid layer should be thin to reduce reagent consumption. The thickness of the liquid layer may be below 100 µm, such as below 30 µm, such as below 10 µm, such as in the range of 0.5 µm to 1.5 µm, such as in the order of 1 µm.

The liquids used in the apparatus according to the first aspect may be any type of liquid used in microscopic imaging, such as liquids adapted for NGS sequencing. The liquids may be water-based, i.e. comprising a majority portion by weight of water.

The liquid dispensing means preferably comprises a liquid channel capable of transporting liquid to the sample holder surface; and a liquid outlet in liquid connection with said liquid channel adapted to add (dispense) liquid from the liquid channel onto the surface of the sample holder. Said added liquid may have any preferred composition, concentration, pH, or temperature suitable for the purpose of the next step of the assay. For instance, it may have a zero concentration or close to zero concentration of reactants and thus the upregulation of the liquid layer thickness leads to a dilution of any reagent already present in the liquid layer acting as a reaction medium.

The liquid dispensing means preferably comprise a liquid outlet in liquid connection with a liquid reservoir via a liquid channel, the liquid dispensing means being adapted to add liquid from the liquid channel to the surface of the sample holder. The liquid channels in the present disclosure may comprises a flexible tube, such as a flexible polymer tube.

The liquid may be dispensed through the liquid outlet to the rotating surface of the sample holder. A flow vector of the liquid may be directed at a small angle relative to the tangent of said surface. The velocity of the liquid when leaving the channel is suitably chosen such that it coincides with a peripheral velocity of said surface of the rotating sample holder. This way, the liquid deposited on the rotating surface stays in the location where it was deposited. Once the liquid is added to the sample layer it is typically unevenly distributed and needs to be redistributed or smeared out to cover every desired location of the sample layer. The liquid contacting portion may be used to redistribute and/or change a thickness of liquid layer, as well as controlling which areas of the sample layers that are covered with liquid. The position of the liquid contacting portion with regard to the surface of the sample holder and the angle of attack can be determined to suit either redistribution of liquid on the surface or adaptation of the thickness of liquid on the surface.

The liquid outlet of the liquid dispensing means may preferably be in liquid connection with at least one liquid container adapted to contain liquids. The pressure in said liquid container may be regulated by liquid regulation means, such as with pumps and/or controllable valves and thus the flow of liquid from the liquid reservoir to the outlet, via the liquid channel, can be regulated. The pumps and/or controllable valves may be connected to a control device such that the amount of liquid added to the surface can be controlled by the user or preset according to a specific protocol. The liquid dispensing means may preferably be capable of transporting very small amounts of liquid with very high accuracy and precision.

In other examples, several liquid containers containing liquids with different chemical compositions, e.g. different substances, different concentrations or different pH, may be connected via liquid channels to the liquid dispensing means disclosed herein. In a preferred embodiment, said plurality of liquid containers are connected to separate liquid dispensing means. The advantage with such a configuration is a that no rinsing, flushing or cleaning of neither said liquid dispensing means nor said liquid removing means is needed between different operations or steps of an assay. This may further reduce the individual cycle time of the assay. However, embodiments where two or more different liquids are dispensed through the same dispensing outlet are also encompassed by the present invention. In another example, the temperature of the liquid to be dispensed can either be controlled by controlling the temperature of the liquid in the liquid container or by heating or cooling the liquid when passing through said liquid channel to the liquid dispensing means.

The liquid contacting portion may be adapted to mechanically contact, during rotation of the sample holder, the liquid layer present on the sample holder thereby displacing liquid in the liquid layer. It should be noted that mechanical contact here also includes interaction between the liquid in the liquid layer and liquid interacting with the liquid contacting portion.

The liquid contacting means comprises a plate-like element configured to contact a surface of said liquid layer. The plate-like element is flexibly arranged in relation to the cylindrical sample holder. This means, that the plate-like element is arranged at a first predetermined distance from the cylindrical sample holder when no external forces are acting on the plate-like element. This mode can for example be obtained when there is no liquid layer present on the cylindrical sample holder. The plate-like element will further be arranged at a second, larger distance from the cylindrical sample holder when a rotating liquid layer is exerting a force on the plate-like element. The term flexible arranged thus means that the plate-like element is arranged using a flexible portion, or a similar arrangement, that can be contracted upon application of a force, thereby increasing the distance between the plate-like element and the sample container holder as long as the force is applied.

The term "plate-like element" used herein refers to an element having a substantially flat surface adapted to contact the liquid layer, such as a plate or another structure having a flat liquid contacting side. The plate-like element may be attached to a support structure capable of holding the plate like element at a distance from the surface of the sample holder.

By providing a plate-like element as described above, the thickness of the liquid layer can be controlled. By positioning the plate-like element such that it comes into mechanical contact with the liquid layer, the thickness of the liquid layer can be reduced during rotation of the sample holder. During rotation, a predetermined force will be exerted on the liquid layer, thereby smearing the liquid in the liquid layer over the surface of the sample holder such that the thickness of the liquid layer is reduced. A flexibly arranged plate-like element allows for the control of the thickness of the liquid layer by controlling the rotational speed of the cylindrical sample holder.

During operation, when the sample holder is rotating, said plate-like element slides against the liquid layer a flat surface against the curved surface of the liquid layer covering or immersing the samples or analytes immobilized on the curved surface of the cylindrically shaped sample holder. The plate-like element should preferably be positioned such that a line (hereafter referred to as the meeting line) defined by the closest distance between the cylinder surface and the essentially flat surface of said plate-like element, is closer to the center of said plate-like element than to the edges of said plate-like element.

The plate-like element may be attached or mounted on a structure comprising a force controlling element, thereby obtaining the flexible assembly. The force controlling element is configured to control the amount of force that the plate-like element exerts on the liquid layer. Thus, the thickness of the liquid layer will be self-regulating. Compared to a hypothetical assembly were the plate-like element were to be fixedly mounted in relation to the sample holder, the force controlling means are configured to allow for application of a predetermined force from the plate-like element on the liquid layer independent of the amount of liquid in the liquid layer. Thus, a self-regulating function of the liquid layer can be achieved.

The provision of a force controlling element allows for the application of a substantially constant force on the liquid layer, independently of the amount of liquid in the liquid layer, which in turn allows the liquid layer to have a substantially uniform thickness over a circumference of the sample holder. Consider the following example: a first cylindrical sample holder with a first circumference is provided in a first assay. The self-regulation of the liquid layer by the flexibly assembled plate-like element provides a liquid layer having a first thickness over the circumference of the sample holder. In a second assay, the cylindrical sample holder is replaced by a second cylindrical sample holder having a second, larger circumference. The self-regulation of the liquid layer by the flexibly assembled plate-like element still provides a liquid layer having the same, first thickness over the circumference of the sample holder.

The force controlling element could for example comprise a flexible portion, such as a spring having a constant spring force. In other examples, the force controlling element may comprise a spring comprising adjustment means for adjusting the spring force of the spring.

In other examples, the force controlling means may include an actuator adapted to adjust the force exerted on the fluid layer. The force controlling means may also comprise a sensor or measuring device, adapted to sense or measure the pressure exerted by the plate-like element. Preferably, the sensor is configured to communicate its sensing or measurements to the actuator, or a control device in communication with the actuator, such that the force exerted can be controlled based on the sensing or measurements.

In some embodiments, the force controlling element comprises a flexible portion. The term "flexible portion" denotes a portion of the force controlling element that exhibits an elastic behavior when force is applied to it and subsequently removed. Upon application of a force on the fluid contacting portion, the flexible portion will contract, thereby positioning the fluid contacting portion further from the surface of the sample holder. Upon removal of said force, the flexible portion will expand, thereby positioning the fluid contacting portion closer to the surface of the sample holder. In an example, the flexible portion is a spring. The fluid contacting portion is then attached to the spring, which in thus is attached to a structure for holding the fluid contacting portion. The structure should be substantially stationary in relation to the sample holder upon application of a force on the fluid contacting portion.

Preferably, the flexibility of the flexible portion can be adjusted, for example by the provision of an adjustable spring. Thus, the thickness of the fluid layer can be controlled by adjusting the flexibility of the flexible portion.

Preferably, the force applied to liquid contacting portion by the force controlling arrangement should be small in relation to the forces exerted on the liquid contacting portion by the liquid layer, so that the distance between the liquid contacting portion and the cylindrical sample holder may be determined by a balance between capillary, i.e. surface tension, forces and lubrication forces. The capillary forces will, provided the liquid contacting portion provides for a low enough contact angle with the liquid in the liquid layer, attract the liquid contacting portion towards the sample holder. The lubrication layer formed between the rotating sample holder and liquid contacting portion will provide for a force resisting the attraction. Thus, the distance between the liquid contacting portion and the sample holder, or in other words the thickness of the liquid layer, will adjust itself so that the acting forces balance each other.

In a simple model one may consider the effects of surface tension and lubrication as pressures. The pressure caused by surface tension is, to a first approximation, dependent on surface tension of the liquid, the contact angle for the liquid contacting portion, and the thickness of the liquid layer. The lubrication pressure is, to a first approximation, dependent on the viscosity of the liquid, the rotation rate, the radius of the sample holder and the thickness of the liquid layer. Thus, for a given rotational rate, an equilibrium thickness of the liquid layer may be calculated.

In some examples, the liquid contacting portion may comprise a polymer material. The liquid contacting portion may also comprise glass, a metal, or any other suitable material.

The apparatus preferably comprises a reagent dispensing means. Reagents are preferably provided to the liquid layer such that they can react with the samples. The reagent dispensing means may be provided as a combined structure with the liquid dispensing means. Stated differently, the liquid dispensing means may be arranged to supply both liquid and reagents to the lateral surface of the sample holder. However, the reagent dispensing means may also be provided as a separate structure.

The reagent dispensing means may comprise an outlet, for example formed by an orifice, in liquid connection with a liquid channel configured to transport reagents to the liquid outlet. The reagents can then be distributed to the liquid surface by the outlet. The flow of the reagents through the channel may be controlled by a pump. The dispensing means may be capable of accurately dispensing very small amounts of reagent liquid, such as in the range of microliters, such as in the range of from 1 microliter to 500 microliters.

In some examples, the reagent dispensing means comprises means to regulate the flow therethrough, preferably through at least one electrically controlled valve. The at least one electrically controlled valve may in some examples be used in conjunction with a pump for regulating the flow of reagent liquid.

By rapidly alternating between dispensing liquid or removing liquid, it is possible to change the local composition, concentration, pH and temperature of the reaction medium catering to the abovementioned goal of the invention.

The liquid contacting portion may be arranged such that it can be positioned in very close proximity to or in mechanical (liquid) contact with said liquid layer, preferably by means of translation stages and rotations stages, preferably with micrometer precision. The liquid contacting portion means are further preferably arranged stationary relative said rotating sample. Thus, when the liquid contacting portion is in contact with said liquid layer, the relative motion of said liquid contacting portion and said liquid layer will induce a mechanical force on said liquid layer. Depending on the shape and the positioning of the liquid contacting portion, said force will cause a local displacement of a portion of liquid or a separation of a portion of liquid from said liquid layer.

The liquid contacting means, the liquid dispensing means, the liquid removal means, and the liquid may be referred to as various "liquid manipulation means". A common denominator for all the liquid manipulating means disclosed herein is that they are compatible with and in some cases utilizing the fact that the manipulation can carried out while the sample holder is rotating. Due to the rotation of the sample holder, the liquid manipulating means may be provided such that it is stationary, or non-co-rotating, during operation of the sample holder. This is advantageous in that it provides a much higher precision in its position relative to the rotating sample holder.

Prior art "next generation sequencing (NGS)" operations typically involve steps like: adding a reaction medium containing a set of reactants to a sample volume containing a certain set of immobilized target molecules; allowing time for the reaction to take place; diluting the reaction medium and thus preventing excess reactants that did not react with the target molecule to contaminate subsequent reaction mediums; and detecting of a signal indicating the occurrence of a reaction in said sample volume. In such prior art operations, the step of diluting the excess reactants are performed by flushing the samples with a liquid of zero concentration of reactants. Because of the laminar flow in this situation, the time required to get a satisfactory low concentration of excess reactants in the sample volume depends on how fast the reactants will diffuse from the reaction medium liquid layer (covering the samples in the sample volume) into the zero-concentration layer of liquid flushed on top of the liquid layer covering the samples. The required time depends quadratically on the thickness of the liquid layer covering the sample volume, because the diffusion time increases quadratically with the distance. In addition, the diffusion constant typically decreases near a solid surface. In the prior art, this step is often very time consuming and may be rate limiting for several applications.

In the present disclosure, there is provided an apparatus capable of rapidly regulating the concentration of reactants or other substances in the liquid layer covering or immersing samples on a rotating sample holder by providing liquid manipulating means to manipulate liquid (and the reagents dissolved or immersed in said liquid) on the sample holder, add new liquid of desired, composition and concentration of substances and pH, to said liquid layer, and disperse said new liquid to the surface of the sample holder. It has been realized that said rapid regulation of the composition and properties of the liquid layer acting as a reaction medium, needs to involve the ability to regulate the amount of liquid in the liquid layer by at times adding liquid to the sample holder and at times displacing liquid on said sample holder and at times removing liquid from said sample holder.

To meet the above-mentioned objectives it was realized that the rotatable cylindrically shaped sample holders, such as the sample holders defined in WO2016/030464 and/or WO2017/144619 forms a very suitable geometry and configuration to enable accurate, swift, and repeatable control of relevant parameters for carrying out the procedures of the assay successfully. The rotation and axial translation of said sample holder grants fast physical access to every point of the sample holders with sub-micrometer precision and hence said parameters can be managed both on the local level, i.e. on the individual sample level, and globally, i.e. over the whole surface covered with samples.

The sample holder may be made of a material selected from the group consisting of glass, metal (for example aluminum or steel) and plastic. Ideally, it is a hollow or solid circularly symmetric cylinder, i.e. a tube or a rod. In order to enable a smooth and precise rotation, it is preferred that said sample holder is designed and manufactured such that it is symmetrical around an axis along its length and that the mass is evenly distributed in all radial directions from the axis. To ensure a smooth and repeatable rotation around its axis, the sample holder may be kept in position by a bearing, preferably an air bearing or an electrodynamic bearing to realize a contactless suspension, said bearing being assembled between said rotating sample holder and an inner or outer fixed fitting.

The sample holder may be provided with designated sample volumes, i.e. certain volumes where samples may be contained or attached in predefined locations on the sample holder surface. The designated sample volumes may also be provided on a sample container, for example wrapped around at least a portion of said sample holder.

The designated sample volumes may be in the shape of minuscule ridges adapted to holding the samples, wells adapted to hold a sample, or in dedicated grooves or wells or between layers of polymer film, e.g. where the outermost polymer film layer is perforated.

The designated sample volumes may be separated from each other. In other examples, the designated sample volumes may be in contact with each other.

By functionalizing parts of the surfaces of the abovementioned embodiments of sample volumes, samples may also be immobilized on the functionalized parts of said sample holder or said sample container surfaces. In yet another embodiment, the whole sample holder surface is functionalized, and samples may be immobilized in random locations on said sample holder surface.

The apparatus may further comprise a housing, in which the sample holder and the fluid manipulation means are housed. The fluid manipulation means may be attached to said housing, such that they can remain stationary during rotation and/or translation of the sample holder.

In some embodiments, the plate-like element comprises at least one orifice configured to at least one of
  dispense liquid to the liquid layer; and
  remove liquid from the liquid layer; and wherein the at
    least one orifice is in fluid communication with a fluid
    channel configured to at least one of:
  transport fluid to the orifice, and
  transport fluid from the orifice.

Said plate-like element may comprise at least one orifice acting as a liquid inlet to optionally enable a flow of liquid from said liquid layer to a liquid channel to transport said liquid away from said liquid layer. The plate-like element may further or alternatively comprise at least one orifice acting as an outlet to add liquid from a liquid channel to said liquid layer. The apparatus may also include means to control the position of said plate-like element, e.g. such that the respective orifice acting as outlet and inlet is in contact with the liquid layer or not. Said control of position may comprise changing a relative position between the sample holder and the plate-like element along a direction substantially perpendicular to a direction defined by the rotation axis of the sample holder.

In some examples, the liquid may be provided by means of a fluid communication, or passage, extending through the plate-like element. Thus, the plate-like element may comprise a first surface configured to face the liquid layer and a second surface opposing the first surface, as well as a passage extending between the surfaces. The orifice may be arranged at the first surface and the passage arranged to provide the fluid communication between the orifice and the liquid channel.

In examples where the liquid contacting portion is provided with a liquid inlet for transporting liquid from said liquid layer, the liquid contacting portion may be adapted to guide liquid from the liquid layer to the orifice. By positioning of said abovementioned orifice acting as an inlet at the part of the liquid contacting portion where the liquid layer is compressed, i.e. before the liquid layer passes said meeting line, the positive pressure gradient caused by the shear forces created by the relative motion between said plate-like element and the cylindrical sample holder will push liquid into that orifice and said liquid can thus be removed from said liquid layer and the thickness of the liquid layer decreases. Thus, the liquid removal means may be provided on the liquid contacting portion.

Once the liquid reaches the inlet, the liquid may be subjected to an under-pressure, i.e. pressure below atmospheric pressure to apply suction to transport the liquid to and through the fluid channel. The suction can e.g. be accomplished by a using an injection pump or an impeller pump.

In examples where the liquid contacting portion is provided with a liquid outlet for transporting liquid to said liquid layer, the orifice acting as an outlet should preferably be positioned after the meeting line, such that liquid can be added through said outlet. The manner of which liquid is added resembles a venturi ejector pump. Thus, the liquid dispensing means may be provided on the liquid contacting portion.

In some embodiments, the liquid contacting portion is provided with both a liquid inlet and a liquid outlet.

By controlling the flow through the liquid channels connected to the inlets and outlets, respectively, the liquid layer thickness can be regulated. The dimensions of said plate-like element will vary depending on application but the width of the contacting portion of the element, that is the width of the element adapted to be in physical contact with the liquid layer is preferably wider than the field of view (FOV) of an imaging system used to investigate the samples. In some examples, the plate like element extends the length of the sample holder. The length should be at least long enough to give room to at least one orifice on both sides of the meeting line. In some examples, the plate like element extends the length of the sample holder. To operate said liquid contacting means at different positions along the rotational axis of the sample holder, the embodiment may include means to effect relative translation of said liquid contacting means and the cylindrical sample holder along said axis.

In some embodiments, the liquid dispensing means comprises a liquid outlet. The liquid dispensing means are capable of adding liquid to the surface of the sample holder via the liquid outlet. The liquid outlet is connected to the liquid channel, such that the liquid dispensing means is capable of receiving liquid from the channel and adding it to the surface of the liquid layer. The liquid outlet may be connected to the liquid contacting portion, and the liquid contacting portion may comprise conduits and/or channels for delivering liquid to the surface of the sample holder. The liquid outlet may also be adapted to function as a nozzle such that liquid can be sprayed onto the surface of the sample holder.

In some embodiments, the apparatus further comprises a mixing tool arranged to induce mixing in said liquid layer. In order to achieve an even concentration of reagents or other substances in the liquid layer, it is advantageous to induce mixing to help even out the concentration. The mixing tool may comprise means for translation and/or rotation stages allowing the mixing tool to move the liquid in the liquid layer such that mixing is induced. The mixing tool may comprise at least one of a brush a plate-like element comprising a least one ridge and a plate like element comprising at least one pillar. The plate-like element may be the same as the liquid contacting portion, or a different, second plate-like element.

In embodiments where the liquid contacting means is a plate-like element, the mixing tool may be a ridge attached to the plate-like element on the side adapted to be in contact with the liquid layer.

In some embodiments, the apparatus further comprises a temperature control means for raising or decreasing the temperature of the liquid layer. The apparatus may further comprise means to regulate the temperature of the atmosphere surrounding said liquid layer and the temperature of the peripheral part of said sample holder on which surface samples or analytes under investigation are placed.

Since reaction speed strongly depends on the temperature of the reaction medium, the ability to control and regulate the temperature, not only in the liquid layer, but also in the surroundings of said layer is advantageous. Surroundings here means the lateral surface of the sample holder underneath the liquid layer and the atmosphere immediately above the liquid layer. Temperature regulation can further be divided into slow regulation, where the main purpose is to keep a stable temperature across every part of the liquid layer (reaction medium), and fast regulation, where the temperature in the reaction medium in some assays need to be locally regulated up or down in the order of seconds or even less.

For increasing the temperature over the whole liquid layer, one embodiment comprises an electrically conducting lead attached to the cylindrical sample holder. Preferably, said lead is densely winded onto the perimeter of said sample holder in a helical fashion in a single layer on all parts of the sample holder that need temperature regulation. Said lead may also be provided with a thin electrically insulating coating to ensure that the resistance along the path of the winded lead is orders of magnitude lower than any shorter paths along the sample holder. In order to position the lead on the sample holder, it may be winded about the lateral surface of the sample holder in a helical pattern. The lead is preferably grinded and/or polished to about half its thickness thus forming a flat surface of conducting material with a helical shape covering the cylindrical shaft sample holder onto which the samples may be placed directly. Alternatively, the sample holder may be provided with additional layers in between. Said additional layers may be equipped with wells or groves or the like for containing samples. By running a suitable current through said wire the ohmic losses will generate heat which will dissipate into the reaction medium of the sample layer. By controlling said current the temperature of said liquid layer can be controlled with high precision.

Another means to regulate temperature of the reaction medium is to add fluid, with a higher temperature than said liquid layer and thus gradually increase the temperature of said liquid layer, or if so is desired, add fluid with a lower temperature than said liquid layer and thus gradually decrease the temperature of said liquid layer. To speed up, the change in temperature, the means to remove fluid from the liquid layer, are essential, since fluid with an undesired temperature then can be faster replaced by a fluid with the desired temperature.

From the above, it becomes clear that there are several means to regulate the temperature of the reaction medium to a desired setpoint. It also clarifies the need to simultaneously control the temperature of the liquids added to the liquid layer, the temperature of the atmosphere surrounding the liquid layer, and the temperature of the sample holder just beneath said liquid layer.

The abovementioned embodiment for increasing the temperature of the liquid layer allows for homogeneous and precise temperature regulation. In some assays, however, a local and more instantaneous upregulation is desirable. In one embodiment, there is provided a radiation source for fast upregulation of the temperature. The radiation source may comprise a mid-infrared (MIR) range radiation source, preferably a carbon dioxide ($CO_2$) laser. The standard wavelength of $CO_2$ lasers, 10600 nanometers, is very effectively absorbed by a liquid layer comprising water and the absorbed energy from said source thus can be used for both heating and/or, if desired, evaporating the liquid layer. When focusing said source on a small spot, such as 20 times 20 micrometers or smaller, exceedingly small amounts of radiation are required to raise the temperature of the irradiated volume. To precisely control a temporary raise in temperature, the thickness of the liquid layer needs to be known or controlled and so is the amount of MIR radiation exposed to the targeted volume of the liquid layer. Said control of the amount of radiation may be implemented in many ways. Preferred embodiments include controlling the output power and duty cycle of pulsed sources or using filters, beam splitters, shutters, and output power control for continuous wave sources. Preferred embodiments also comprise temperature sensors monitoring the local temperature of fluid at the irradiated volume. The source may be positioned stationary, i.e. not co-rotating with sample holder, so that the radiation is guided onto the desired location on the rotating sample holder.

In yet another embodiment said temperature control may be achieved by dielectric or capacitive heating between a conductive layer on said sample holder and an electrode in contact with the liquid layer. The temperature control means may also comprise a Peltier element.

In some embodiments, the apparatus further comprises means for measuring a quantity indicative of a concentration of said reagent in said liquid layer. Such means may for example include a pH meter, but means for measuring other quantities indicative of a concentration of a particular reagent are known to the person skilled in the art.

In some embodiments, the apparatus further comprises illumination means for illuminating said sample, an objective for collecting photons emitted or scattered from the sample, and detection means for detecting photons collected by the objective, wherein optical contact between the objective and the sample is provided at least partly by the liquid layer. This type of embodiments may comprise a liquid contacting means in the shape of a thin glass plate, e.g. a cover glass, arranged for contacting the liquid layer and a drop of immersion oil placed between the cover glass and the objective. In some embodiments, both exciting light (i.e. the illumination) and emitted light (or photons) go through the same objective.

In some embodiments, the apparatus further comprises
   illumination means for illuminating said sample simultaneously in a line focus or an array of foci; and
   detection means for detecting photons emitted or scattered from a sample simultaneously in an array of fields of view;
   wherein an array of sub-observation volumes in a sample, from which photons are emitted or scattered during imaging, is defined by the volumes in space where the line focus or array of foci from the illumination means overlap with the corresponding array of field of views of the detection means;
   wherein the sample holder is arranged such that at least a portion of said sample can be transported through at least one of said sub-observation volumes by rotating the sample holder.

Suitable illumination and detection means are described in WO2017/144619, in which the definition of the sub-observation volumes is also disclosed.

In some embodiments, the liquid contacting portion is in the shape of a sickle, a cutting tool, a brush or a blade. The liquid contacting portion should have sufficient mechanical stability such that it can contact a liquid layer present on the sample holder and displace or remove the liquid mechanically. The liquid manipulating means may further comprise means for adjusting the angle of attack of the liquid contacting portion. By adjusting the angle of attack, the amount of liquid being removed can be controlled. The liquid contacting portion may, still further, comprise translating means adapted to adjust the distance from the surface of the sample holder at which the liquid contacting portion is positioned. Adjusting the distance from the surface is also a means of adjusting the thickness of the liquid layer remaining on the surface after the liquid contacting portion has contacted the liquid during rotation of the sample holder.

In one embodiment, the liquid contacting portions comprises at least one selected from a blade, a squeegee, or a brush. When the liquid contacting portion contacts the liquid layer, the angle of attack may be positive, thus making the liquid contacting portion slide on the liquid surface and the pressure from the liquid contacting portion will therefore build up a droplet of liquid moving in front of said liquid contacting portion. By choosing the right angle of attack, a design with the right stiffness (mechanical stability) of the liquid contacting portion and choosing a position of the liquid contacting portion relative to the rotating sample holder, said droplet of liquid, with reactants therein, may be made grow to a size facilitating a separation of a portion of the liquid in said droplet from the sample holder liquid layer. Alternatively, by gradually moving the liquid contacting portion along the rotating sample holder the droplet can be guided to a point where it can be absorbed or guided off the sample holder surface.

In another embodiment the mechanical displacement of a portion of the liquid layer accomplished by arranging the liquid contacting portion with a negative angle of attack such that said liquid contacting portion when in contact with the liquid layer on the rotating shaft, in a lathe-like fashion cuts and separates the liquid on the surface into a remaining part that stays on the surface of the rotating shaft and a shed part flowing on the other side of the liquid contacting portion enabling said shed part of said liquid layer to be redirected away from the rotating shaft. Said shed portion may subsequently be collected for reuse or controlled disposal via a liquid inlet positioned on the liquid removal means. The liquid contacting portion in this embodiment for this purpose comprises a sharp front edge in the direction of the motion that cuts and divides the liquid layer when said liquid contacting portion is moved through said liquid layer.

In some embodiments, the liquid removal means of the present disclosure comprises a liquid absorption means adapted to remove liquid from the sample layer by transportation of said liquid through said liquid absorbing means to a liquid inlet provided in fluid communication with the liquid removal mean. The liquid removal means may comprise a liquid absorption means adapted to be in liquid communication and in contact with the liquid layer during rotation of the sample holder. The liquid absorbing means preferably comprises at least one conduit and/or channel provided in the liquid contacting portion. The liquid may be transported from the surface of the sample holder by means of capillary forces and/or other forces, such as forces created by a pump.

Thus, excess liquid can be removed from the surface in a quick and efficient manner. The thickness and shape of the liquid layer can be carefully controlled and adapted to specific applications.

In a second aspect of the present invention, there is provided a method for conducting an assay on samples and/or processing a sample in an apparatus which may be similarly configured as the apparatus described above with reference to the previous embodiments. The method may comprise the steps:

a) arranging a cylindrical sample holder in the apparatus;
b) providing at least one sample to be studied to the cylindrical sample holder;
c) providing liquid of a first type to the sample holder,
d) distributing said liquid to form a liquid layer on said sample holder;
e) providing a reagent to said liquid layer;
f) allowing at least one desired reaction to take place between said reactant and said at least one sample; and
g) removing liquid from the liquid layer.

The method disclosed in the second aspect of the present invention may alleviate at least some of the problems associated with prior art techniques. In particular, the liquid handling time required to remove excess reactant liquids from the surface of the sample holder may be vastly shortened. The method may preferably be performed in an apparatus as described in the first aspect of the present disclosure.

In some embodiments, steps b-g) are performed when the sample holder is arranged in the apparatus, and preferably during rotation of the sample holder.

In some embodiments, step g) is performed by contacting the liquid layer rotating on the surface of the sample holder in such a way that an excess of reaction liquid is removed by separating excess liquid from the liquid layer.

The liquid manipulating means described in relation to the first aspect of the present disclosure provides a liquid contacting portion and a liquid removing means adapted to remove liquid from the surface by physically contacting said liquid.

Step d), in which the liquid is distributed to form a liquid layer on the sample holder, may further comprise a step of controlling the thickness of the liquid layer by arranging a plate-like element, flexibly assembled in relation to the cylindrical sample holder as previously described, in liquid contact with the liquid layer.

In some embodiments, step g) is further performed by the apparatus receiving liquid from the surface of the sample holder in a liquid inlet as defined in relation to the first aspect, and transporting the liquid from the surface via the liquid channel. As disclosed in the first aspect of the present disclosure, the liquid manipulating means may be capable of separating liquid from the surface of the sample holder and transport said liquid from the surface of the sample holder.

In some embodiments, the method further comprises a step h) illuminating said sample and detecting photons emitted or scattered from said sample. This step may be performed while the sample holder is rotating. Rotation based imaging solutions are further described in WO2016/030464 and WO2017/144619.

In some embodiments, the method further comprises a step g1) diluting the reagent concentration in the liquid layer by adding liquid of said first type to the liquid layer.

In some embodiments, the method further comprises a step e1) increasing the reagent concentration in the liquid layer by evaporating liquid from the liquid layer. This may be accomplished e.g., by raising the temperature or decreasing or stopping the supply of liquid to the liquid layer.

In some embodiments, the method further comprises a step of inducing mixing in the liquid layer, in order to even out the concentration of reagents in the liquid layer.

In some embodiments, the method further comprises a step of regulating the temperature of the liquid layer to a predetermined temperature. In further embodiments, the method may comprise regulating the temperature to a first predetermined temperature when the reagents are added to the liquid layer and regulating the temperature of the liquid layer to a second, predetermined temperature, when liquid is removed from the liquid layer.

In some embodiments, the steps c)-h) are performed during rotation of the sample holder.

In some embodiments, the step g) of removing liquid is performed when the sample holder is stationary.

BRIEF DESCRIPTION OF APPENDED DRAWINGS

The invention will hereinafter be described in detail by reference to exemplary embodiments as illustrated in the following drawings, in which.

Figure 6:
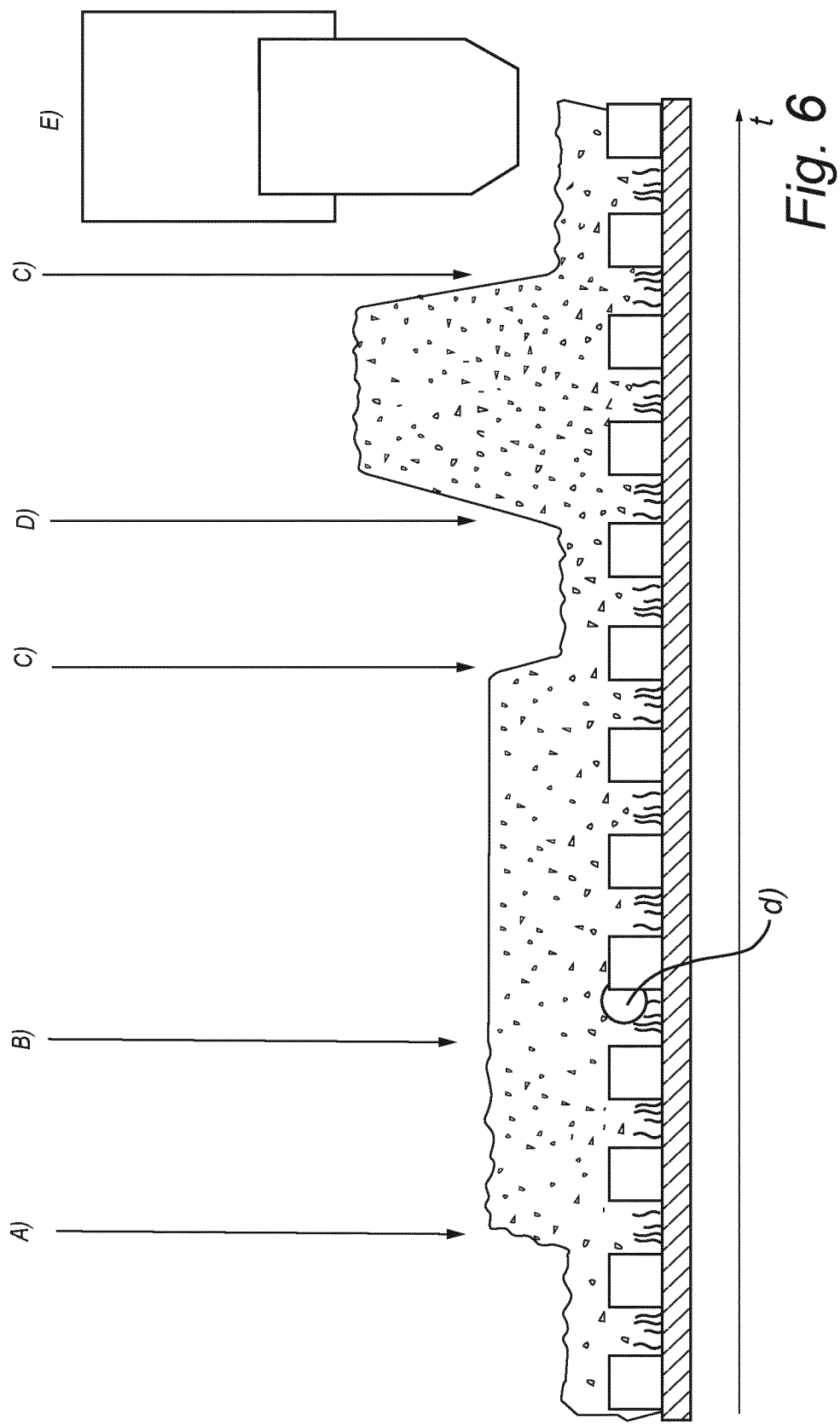

FIG. 6 schematically shows various steps in an assay cycle, according to embodiments of the invention.

Figure 7:
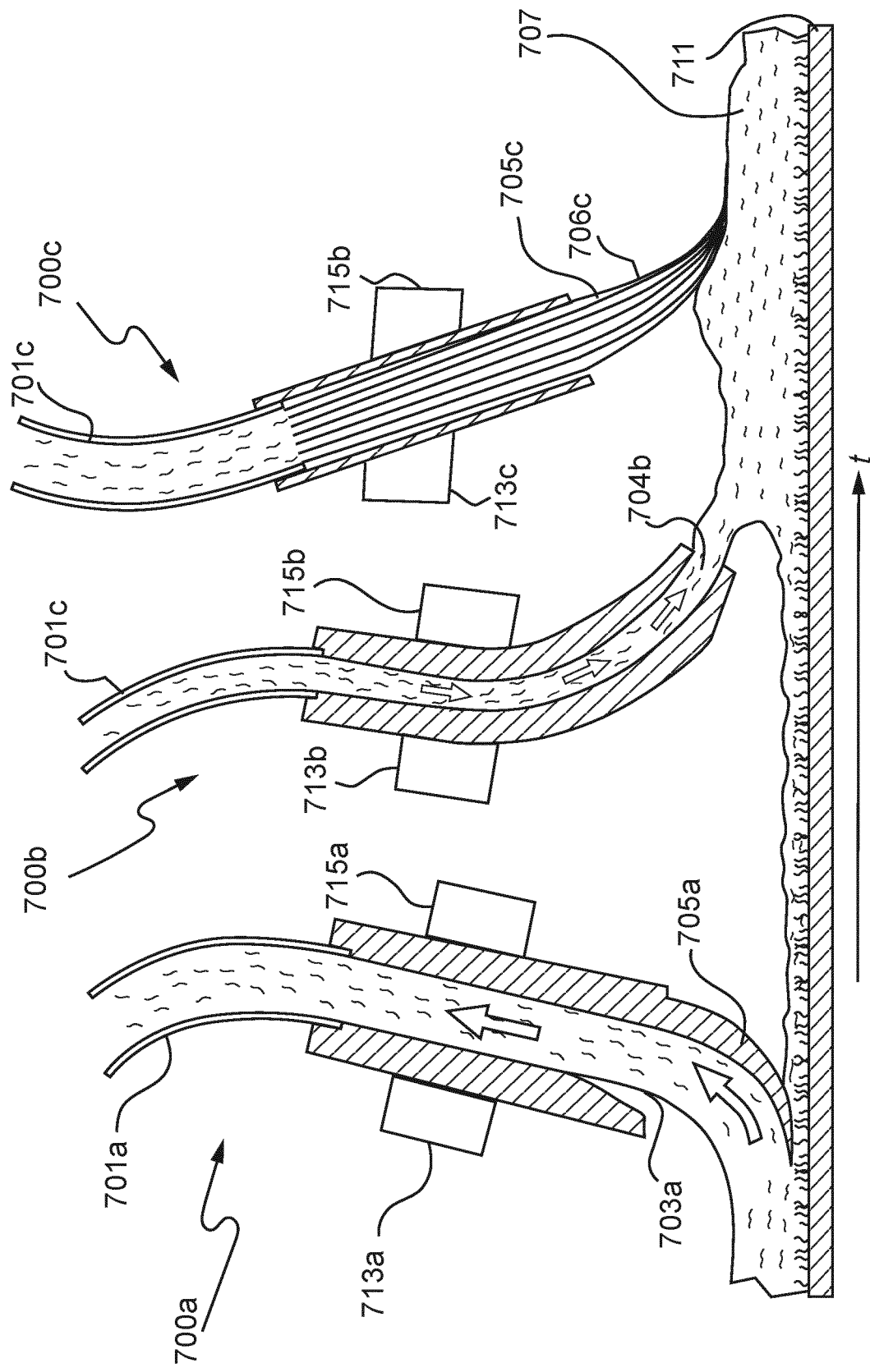

FIG. 7 shows a schematic illustration of an apparatus comprising several liquid manipulating means according to embodiments of the invention.

Figure 8:
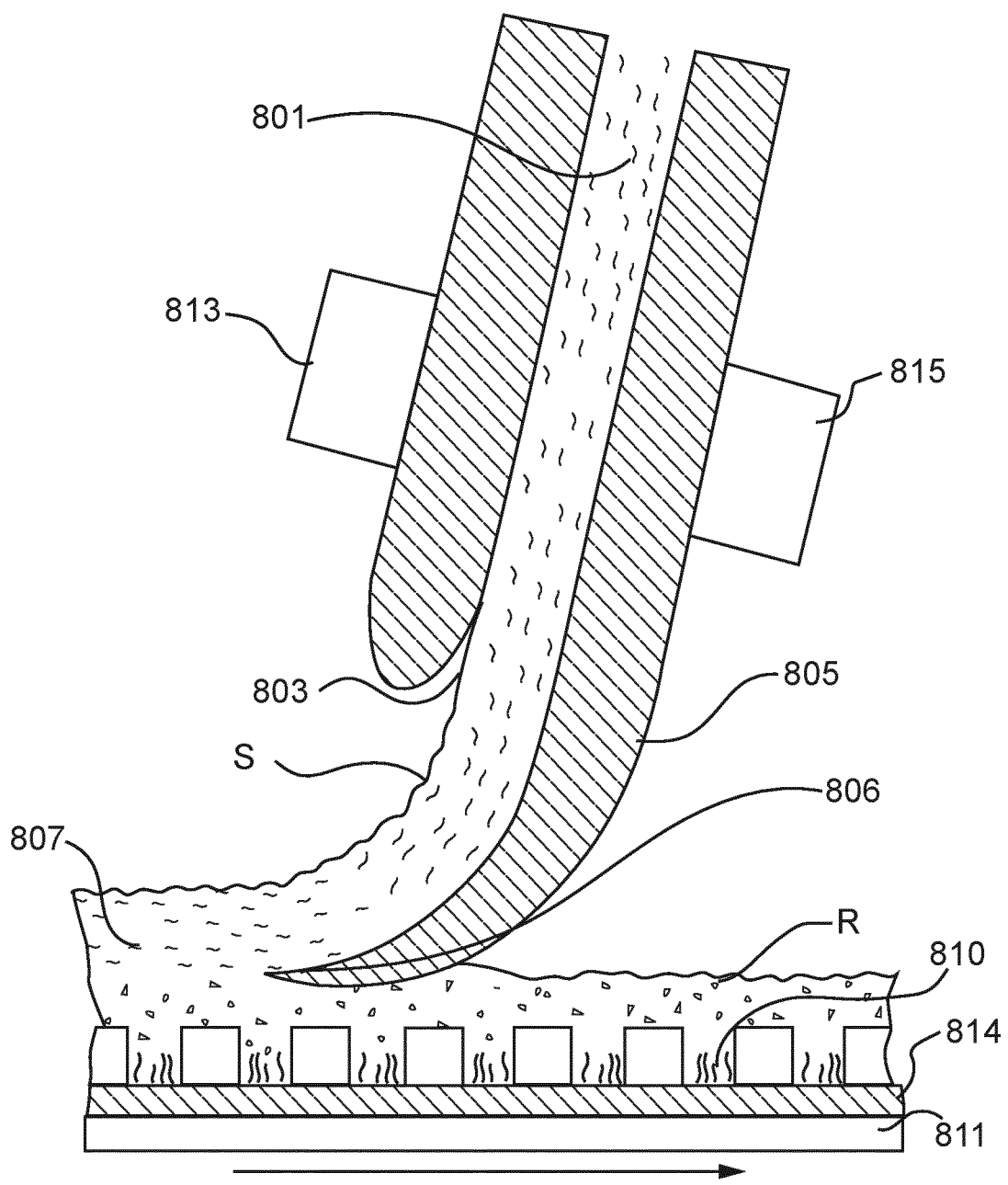

FIG. 8 shows a schematic illustration of a liquid manipulation means according to embodiments of the invention.

Figure 9:
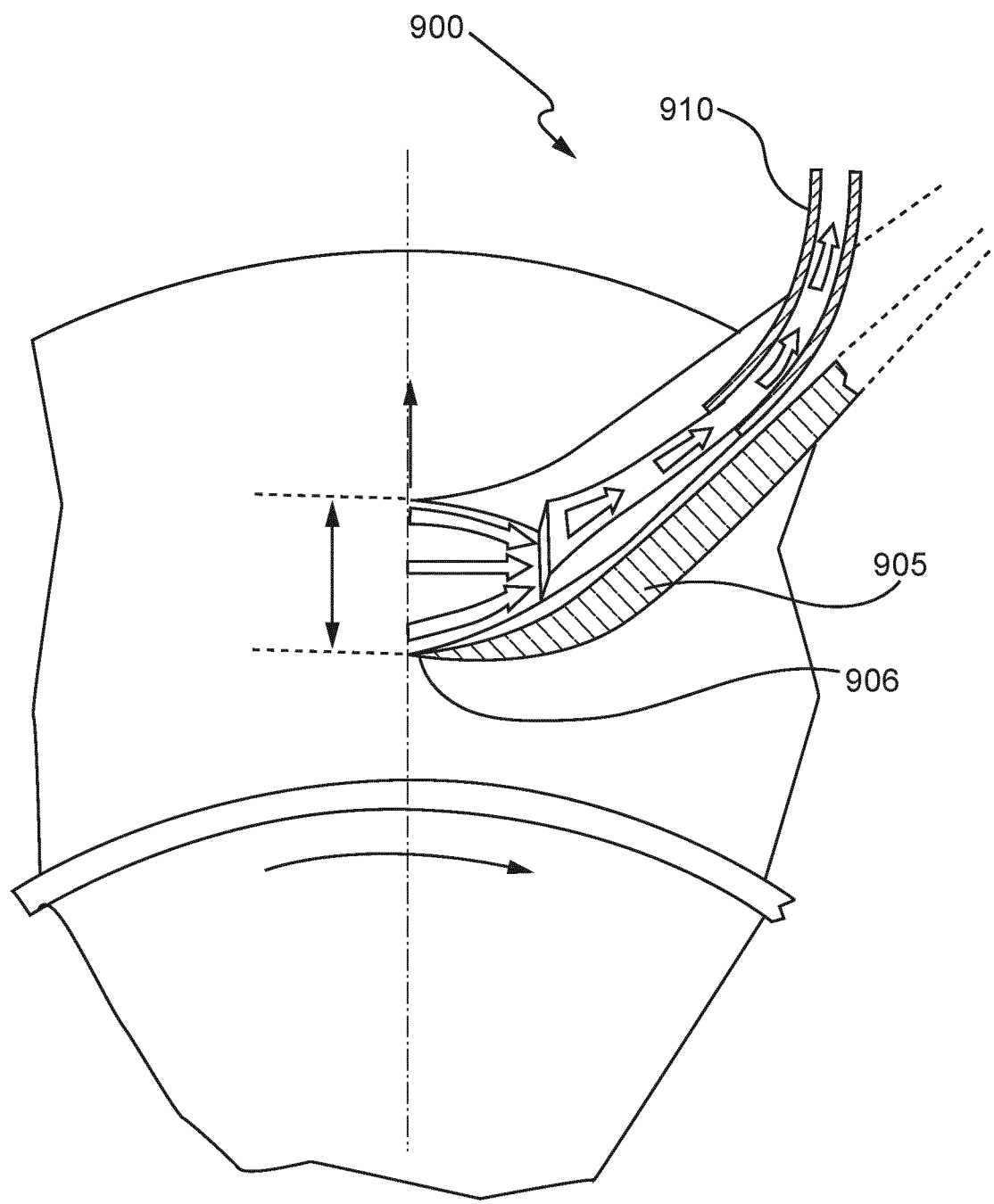

FIG. 9 shows a schematic illustration of a liquid manipulation means according to embodiments of the invention.

Figure 10:
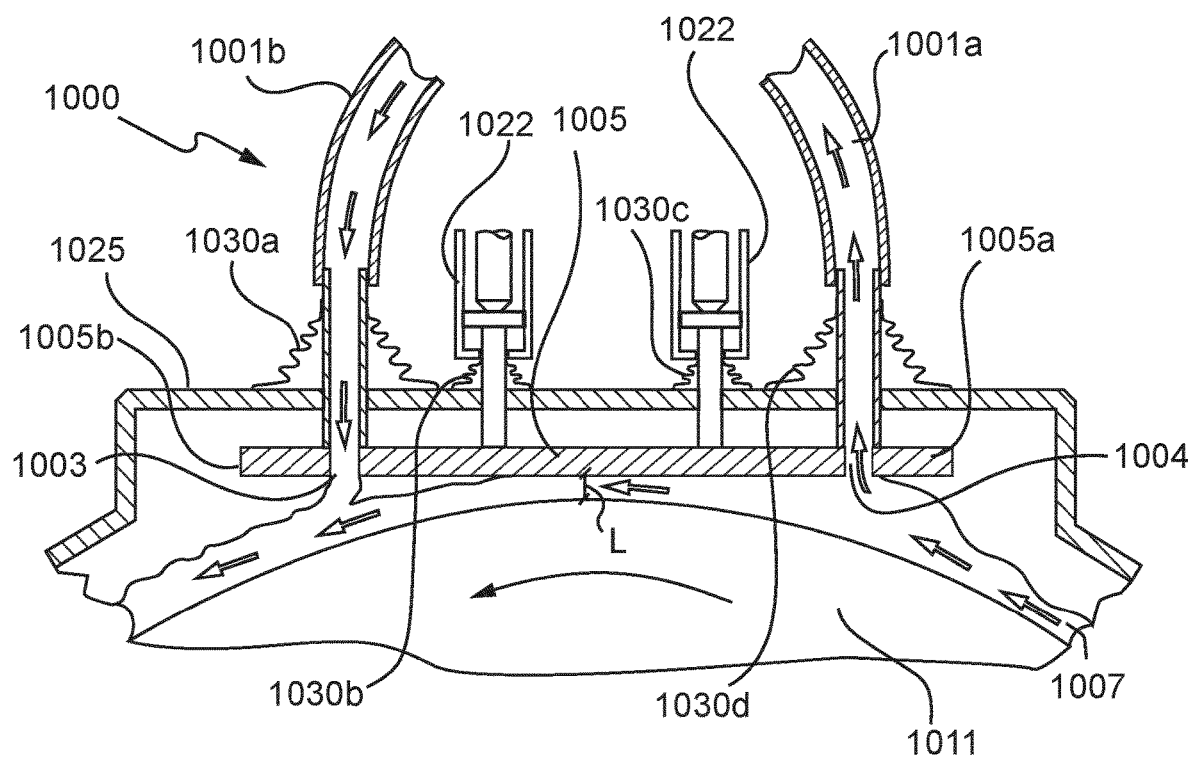

FIG. 10 shows a schematic illustration of a liquid manipulation means according to embodiments of the invention.

Figure 11:
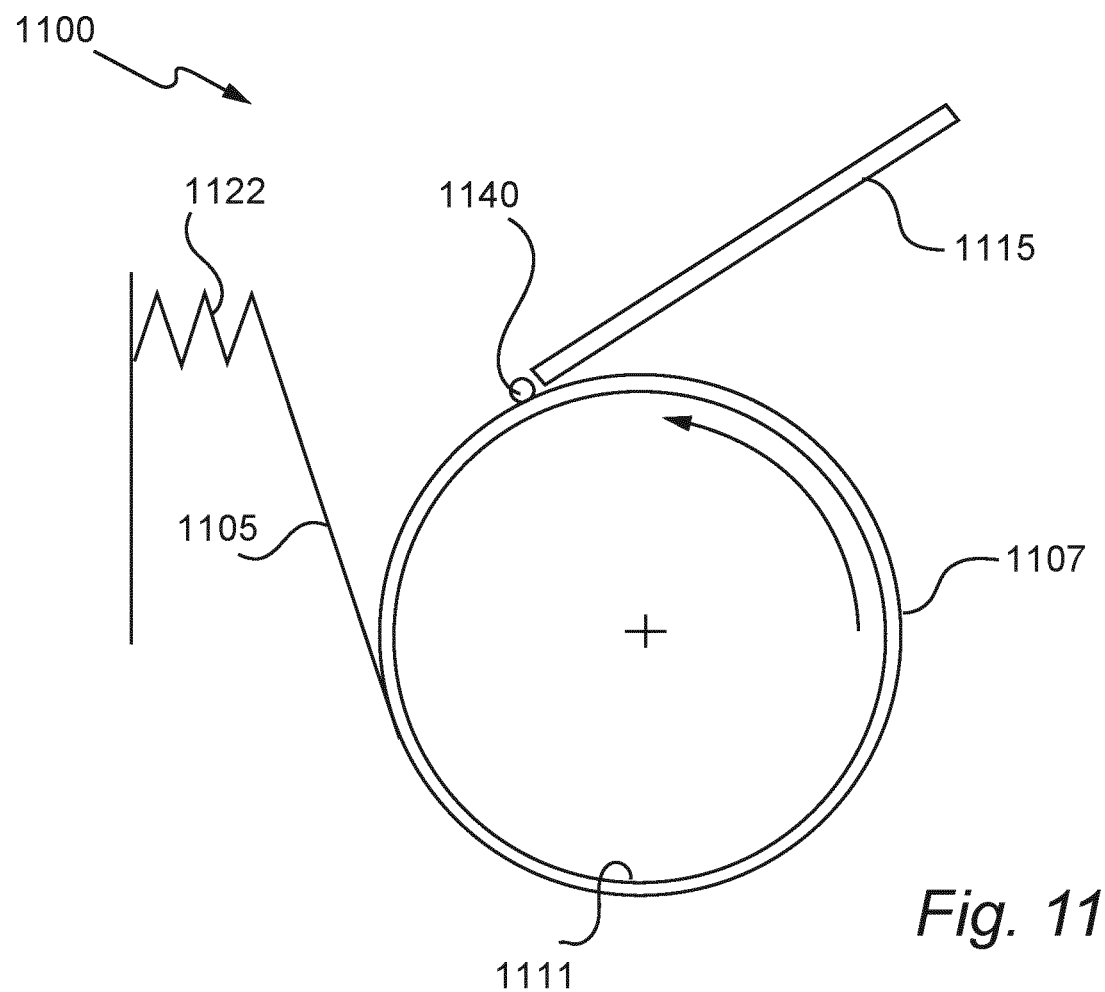

FIG. 11 shows a schematic illustration of a liquid manipulation means according to embodiments of the invention.

DETAILED DESCRIPTION

The present invention is described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to illustrate aspects of the invention to the skilled person. As illustrated in the figures, the sizes of layers and regions may be exaggerated for illustrative purposes and, thus, are provided to illustrate the general structures of embodiments of the present invention. Like elements are numbered alike.

Figure 1:
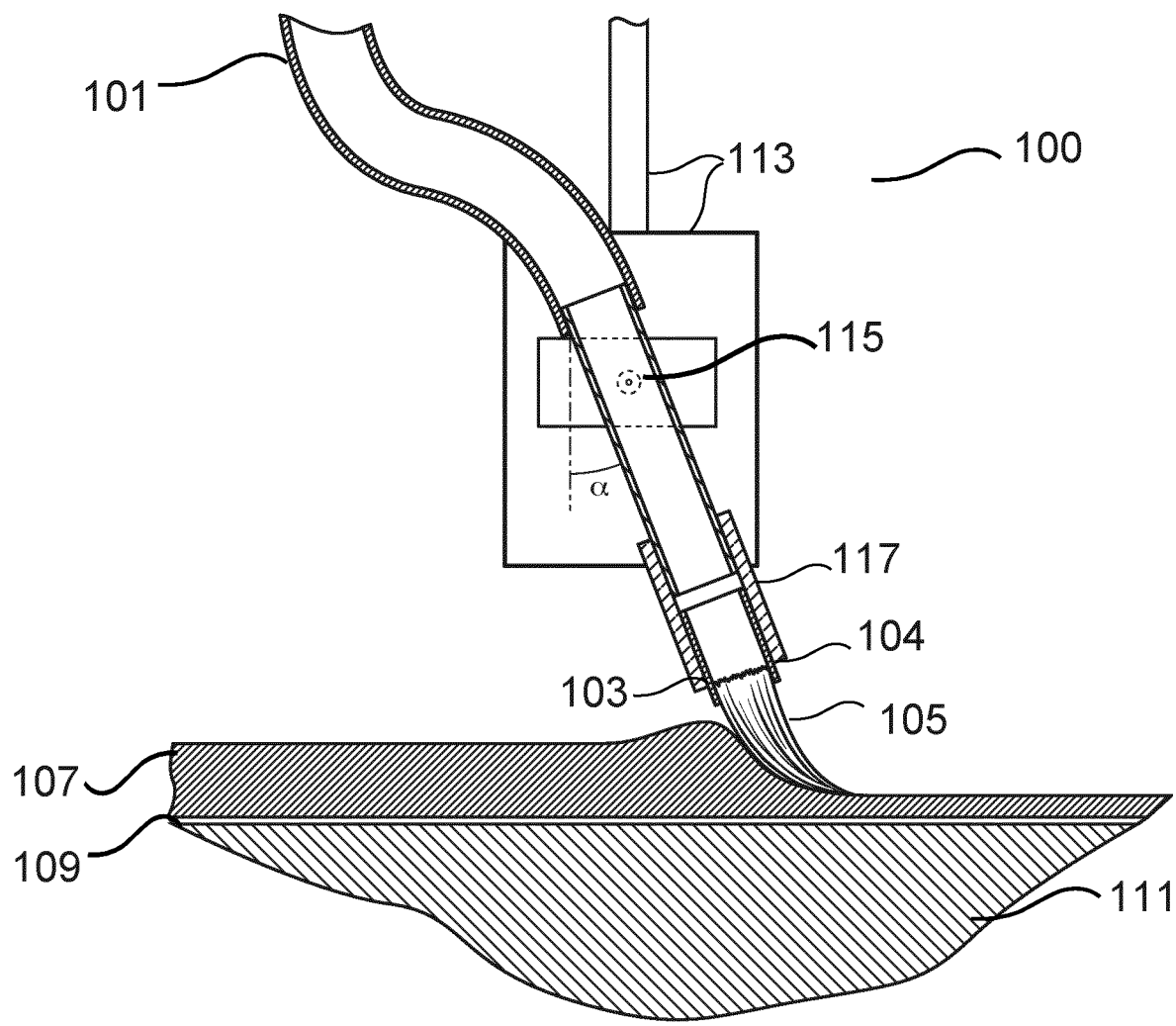
FIG. 1 shows a schematic view of a liquid manipulation means according to certain embodiments of the invention.

An embodiment of the invention is schematically depicted in FIG. 1. FIG. 1 shows a liquid manipulation means 100 according to the invention. The liquid manipulating means 100 comprises a liquid channel 101, a liquid orifice acting as a combined liquid inlet 104 and liquid outlet 103, and a liquid contacting portion 105. Herein, the liquid contacting portion 105 is represented by a brush comprising a plurality of bristles adapted to contact a liquid layer 107 present on a sample layer 109 on the cylindrical sample holder 111. However, the liquid contacting portion 105 could equally well be in the shape of for example a blade, a plate-like element or have a squeegee-like shape. The sample layer 109 is the outer surface of the sample holder 111. In the embodiment shown in FIG. 1, the liquid channel 101 is comprised of a flexible tube, but other channels may also be contemplated. The liquid manipulating means 100 further comprises a translation means 113 adapted to adjust the position of the liquid manipulating means 100 in relation to the sample layer 109. The translation means may comprise an electric motor adapted to adjust the position of the liquid manipulating means 100 along the sample layer 109, but also capable of adjusting the distance between the outer surface of the sample holder 111 and the liquid contacting portion 105. The liquid manipulating means 100 may further comprise an angle adjustment means 115 adapted to adjust the angle α. The angle α is here defined as the angle between the tangent of the surface of said sample holder 111 and the liquid contacting portion 105 when the liquid contacting portion 105 is not yet in mechanical contact with the liquid layer 107 on top of the surface of said sample holder 111 or with said surface itself. Once in contact, the liquid contacting portion may, depending on its mechanical properties, the applied force and the frictional forces against said surface, bend and slide against the surface at a smaller angle. The angle adjustment means 115 may also comprise an electrical motor.

Preferably, at least one of the translation means 113 and the angle adjustment means 115 may comprise a force controlling element adapted to control the with which the fluid contacting portion 105 contacts the fluid layer. 107. The force controlling element may comprise a flexible portion which contracts upon application of a higher force and expands upon removal of said force.

In the illustrated embodiment, the liquid inlet 104 and the liquid outlet 103 is in liquid connection with the liquid channel 101. Thus, the liquid channel 101 can be used to supply the liquid outlet 103 with a liquid, such that the liquid layer 107 can be provided on the sample layer 109.

The liquid manipulating means 101 further comprises a pressure adjuster 117, adapted to adjust the pressure with which the liquid contacting part 105 contacts the liquid layer 107. The pressure adjuster 117 may further comprise a pressure sensor adapted to sense the pressure at which the liquid contacting part 105 contacts the liquid layer 107. The pressure adjuster 117 may in other examples comprise or be comprises of a flexible portion, such as a spring.

In another embodiment, the liquid contacting portion 103 is slightly slanted, such that when the liquid wavelet in front of the liquid contacting portion 105 reaches a certain amplitude, the accumulated liquid leaks past the liquid contacting portion 105 on one side only (akin to how a snow plough is used to push snow off the road). By moving the slanted liquid contacting portion 105 in the direction of the axis of the rotating cylindrically shaped sample holder 111, the liquid is gradually moved towards the end of the sample holder 111 as the relative motion of the slanted liquid contacting layer forms a spiral over said sample holder 111.

In embodiments when the liquid contacting portion 105 is a brush, the plurality of bristles may be positioned in an array at a distance from each other such that the spaces between the bristles enable capillary action on the liquid in contact with the brush and thus the liquid can be absorbed by the brush itself and subsequently transported, via the liquid inlet 104, to the liquid channel 101 where it can be transported to a container adapted to hold the excess liquid. Such a brush may combine the mechanical removal of liquid disclosed above with absorption of excess liquid. An underpressure in the liquid channel 101, for example created by a pump, can transport liquid away through the liquid channel 101.

In a preferred embodiment, the bristles of the brush are made of fibers, which depending on fiber material, have diameters thin enough to bend by the friction caused by the sample layer 109 or a thin lubricating layer formed beneath the fiber, thus slide gently on the surface of said rotating sample holder 111 or sample layer 109, but stiff enough to do mechanical work on the liquid layer 107 and deform the surface of said liquid.

Preferably, the liquid manipulation means 100 shown above is provided in an apparatus further comprising a reagent dispensing means adapted to dispense reagents to the liquid layer. The reagent dispensing means may have a similar configuration as the liquid manipulation means 100. The reagent dispensing means need not comprise a liquid contacting portion or a liquid inlet 103. The liquid outlet of the reagent manipulation means is preferably provided in fluid communication with an outlet valve configured to dispense reagents to the liquid layer 107.

Figure 2:
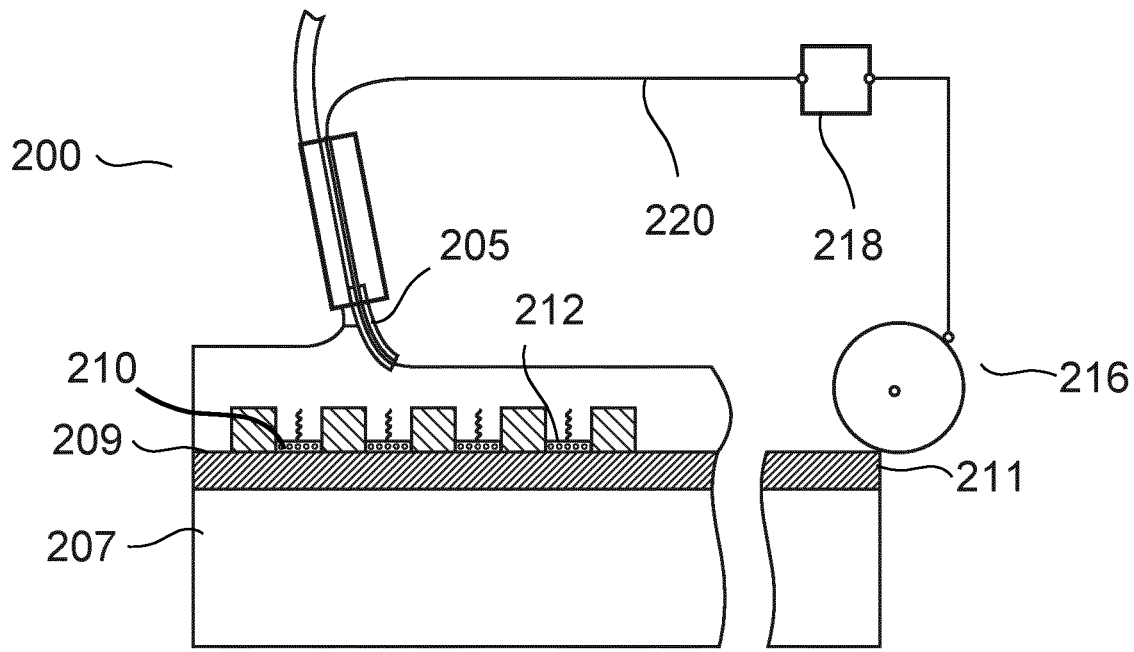
FIG. 2 shows a schematic illustration of an arrangement of liquid manipulation means and designated sample volumes according to some embodiments of the invention.

FIG. 2 shows an embodiment in which the sample layer 209 is provided on the surface of the sample holder 211. The sample layer 209 comprises designated sample volumes 210, shown herein with functionalized surfaces 212 capable of immobilizing a sample in the designated sample volume 210. Beneath the sample layer 209 there is provided a conducting layer 214. The conducting layer 214 is preferably made of a thin layer of a noble metal deposited on the sample holder 211. The noble metal is preferably gold.

A functionalized surface may be provided in several manners. When for example the cylindrical sample holder 211 has an outer layer of a fluorinated polymer film, the sample layer 209 may be functionalized by a first preparation step for adhesion/functionalization by oxidizing the surface and removing the fluorination by either a dry etch such as plasma or corona etch, or a wet etch such as sodium ammonia etch. When the adhesion properties of the surface have been increased, a subsequent optional step may be applied where the surface is coated with a layer of a functionalizing compound to introduce a more specific functionalization. The functionalizing compound may be a monomer that introduces a functionality such as (3-aminopropyl) triethoxysilane or an oligomer/polymer such as polyethyleneimine that includes specific functional groups such as carboxylic acids, amines, thiols, hydroxyl groups, oligonucleotides etc. In one example, the functionalizing compound may include a cleavable group in addition to a functional group, to enable detachment of the sample.

The cylindrical sample holder 211 may be produced of glass by using a lathe. After additional grinding and polishing to minimize surface roughness and aberration from the ideal cylindrical shape, the surface of said cylinder is covered with a thin layer of a noble metal, such as gold. The gold is in turn functionalized with thiols used as an intermediate self-assembled layer with functional groups able to immobilize the target molecules, cells or tissue samples. An advantage with this approach is that the immobilized samples on said thiolized surface can be de-immobilized after completing the assay run on said samples and the sample holder 211 can thus be reused in later assays.

In another embodiment, the sample holder 211, preferably with a gold layered surface, is selectively functionalized using patterning technologies such as lithography to produce arrays of functionalized sites. If, for example, the samples consist of target molecules such as single-stranded DNA molecules, each molecule can in this way be immobilized onto a designated spot or in a designated well. In a preferred embodiment, the patterning for creating said array of functionalized sites for immobilized samples is accomplished according to the following steps: i) rotating the sample holder; ii) adding photoresist to the surface of the sample holder 111 using the liquid manipulating means 100' disclosed herein; iii) distributing said photoresist in an even layer with the desired thickness over the desired surface area of the sample holder 207 using the liquid manipulating means 200 according to the present invention; iv) illuminating the surface of the sample holder 207 with a modulated light source through imaging optics (not shown); v) adding and distributing a developer, i.e. a liquid which either removes the illuminated parts of the photoresist or the non-illuminated parts of the photoresist, to the surface analogously with steps i) and ii); vi) flushing and removing the developed parts (if using positive photoresist) or undeveloped parts (if using negative photoresist); and finally vii) functionalizing the exposed surface of the sample holder 207.

An advantage with this embodiment is that the positions and sizes of said active sites can be very carefully controlled. The feature size using this embodiment is limited by the optics used in the illumination step and is in principle diffraction limited. Another important advantage with said embodiment is that more or less the same apparatus can be used for both preparation of the immobilization of sample (functionalization) and for analysis of the sample.

In FIG. 2, the samples are provided in designated sample volumes 210 that may have the shape of wells separated by walls of photoresist. The designated sample volumes are adapted to be covered with a reaction liquid adapted to react with samples which may be immobilized in the designated sample volumes 210.

FIG. 2 further shows a liquid manipulation means 200 similar to the liquid manipulation means shown in FIG. 1. In FIG. 2, the liquid contacting portion 205 is shown as a blade. The blade is preferably provided with an electrically conductive layer.

The conducting layer 211 functions as an electrode and is connectable during rotation via a slip ring 216 to a stationary voltage source 218. Since the liquid manipulation means 200 also comprises electrically conducting layer either in contact with or close to said liquid layer 207, the liquid manipulation means 200 also functions as an electrode that can be connected via an electrical wire 220 to an electrical potential relative to said conducting layer of the sample holder. This arrangement makes it possible to maintain an electric field over the sample layer or to run a current through the sample layer or to measure the capacitance between said electrically conducting fibres and the conductive layer.

An applied electrical field or a measure of the capacitance can be used for many different purposes, for example controlling the distance of the means to the sample holder 207, pulling electrically charged liquids from the surface of said sample holder 207, and orientation of dipoles or molecules in the sample.

In many assays, the chemistry involves charged particles, such as ions, dipoles, etc. The liquid manipulating means 200 can therefore be utilized to generate a gradient in the electrical potential (an electrical field) over the sample layer or to allow a current of charges to flow to or from the sample layer.

Figure 3:
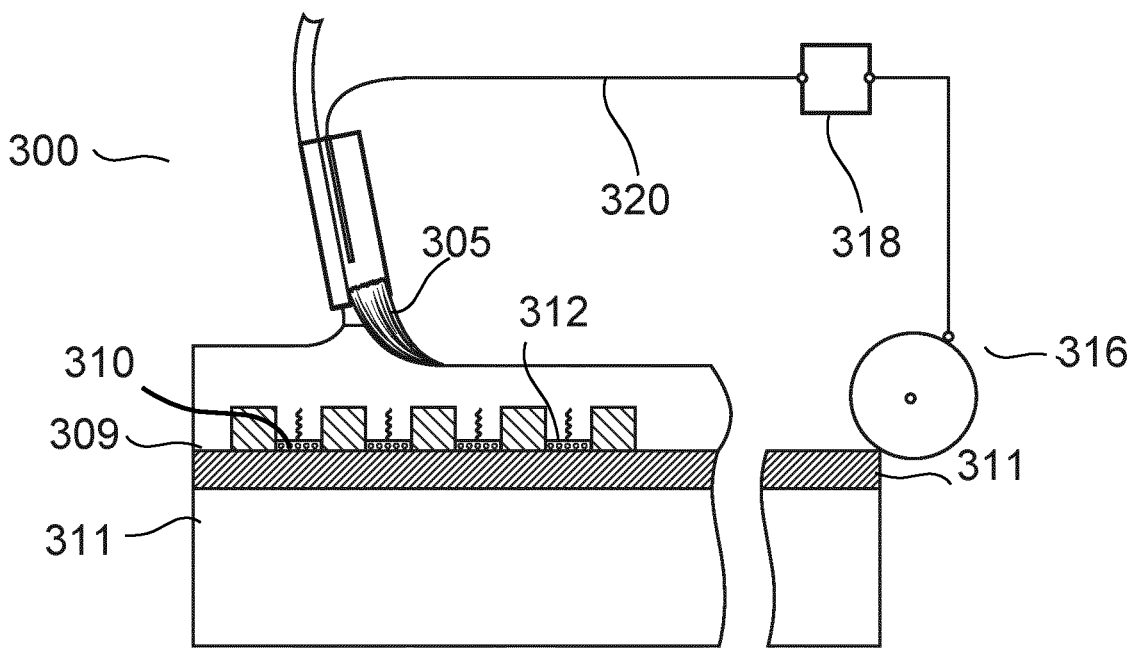
FIG. 3 shows a schematic illustration of an arrangement of liquid manipulation means and designated sample volumes according to some embodiments of the invention.

FIG. 3 shows a similar arrangement as FIG. 2, with the difference that the liquid contacting portion 305 is a brush instead of a blade. At least some of the bristles of the brush may comprise electrically conducting fibers. The electrically conducting fibers may be carbon fibers, such as graphite fibers. The remaining reference numerals starting refers to the corresponding structure shown in FIG. 2 ending with the same two digits.

Figure 4:
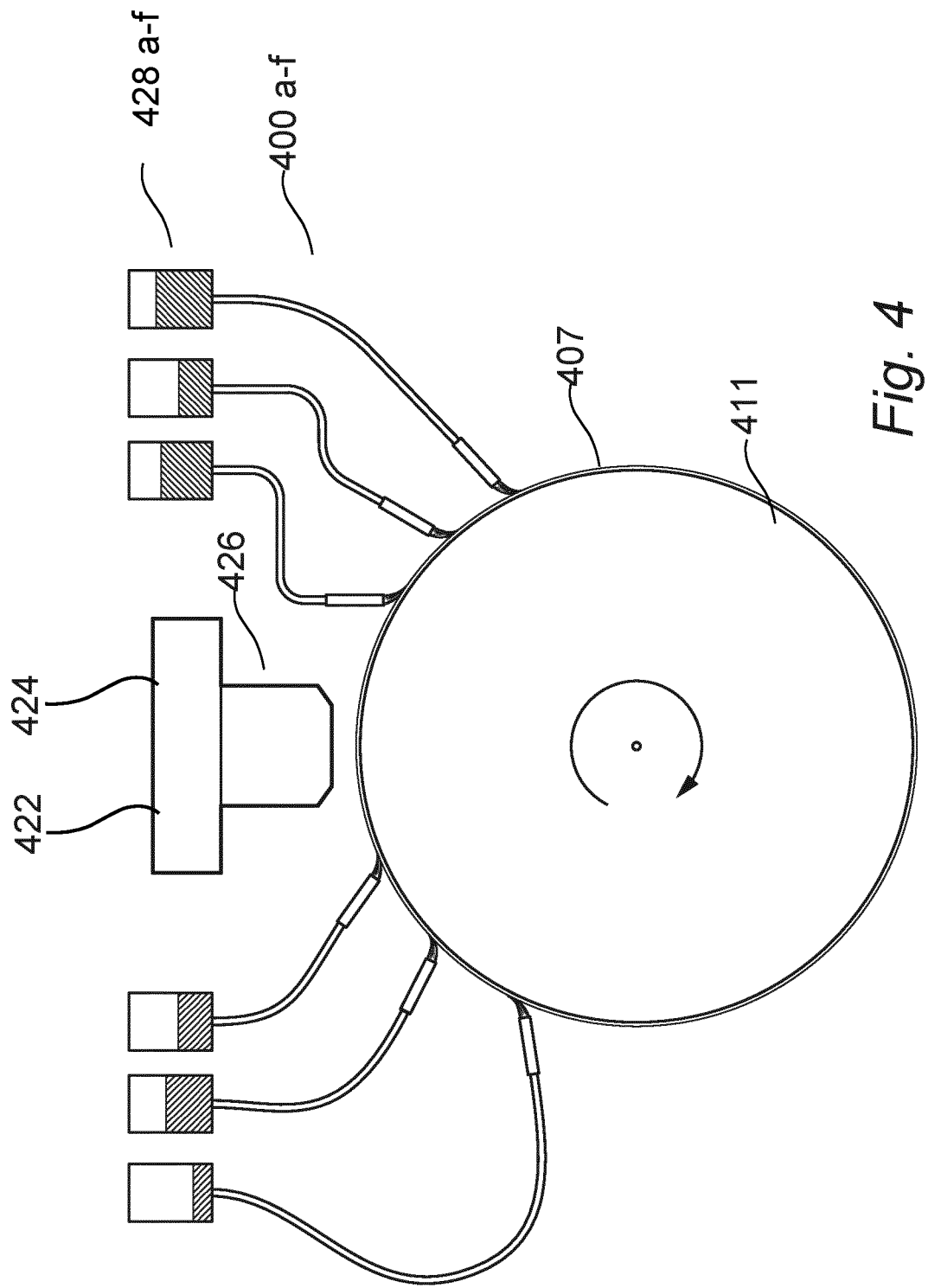
FIG. 4 shows a schematic illustration of an apparatus comprising several liquid manipulating means according to embodiments of the invention.

FIG. 4 discloses a schematic illustration of the inventive concept according to some embodiments. In this schematic illustration, the rotating sample holder 411 has a sample layer 407 extending around the circumference of the sample holder 411. Illumination means 422 and detection means 424 are provided such that samples provided in the sample layer on the surface of the sample holder 411 can be studied. Further shown is imaging optics 426. The imaging optics may comprise beam splitters, mirrors, micro lens arrays, tube lenses, dichroic mirrors, and the like. Preferably, the illumination means and the detection means are positioned in parallel, but other, non-parallel positions may also be contemplated.

Several liquid manipulation means 400 such as the liquid manipulation means 100, 200, 300, 700, 800, 900, 1000 shown if FIGS. 1-3 and 7-10, are provided. In preferred embodiments, the liquid manipulation means 400a-f are capable of adding liquid to the sample layer 407, manipulating liquid present on the sample layer 407 and/or removing liquid from the sample layer. Each liquid manipulation means 400 a-f m connected to a liquid container 428 a-f adapted to hold liquid to be supplied on the sample layer, or to receive liquid removed from the liquid layer 407 the liquid removal means.

The liquid supplied from the liquid containers 428a-f may be compositions, such as reagents, buffer solutions and/or cleaning solutions. Each liquid container may comprise a different liquid or a liquid of a different concentration than the other containers. By providing several different containers, each in liquid connection with a liquid manipulating means, steps of rinsing, flushing and/or cleaning the liquid manipulating means before addition of a different liquid can be eliminated. Instead, the new liquid can be added from a different liquid manipulating means. This further reduces the cycle time of an assay.

In order to transport liquid to and/or from the liquid containers 428a-f, the liquid manipulation means preferably comprise at least one pump and/or controllable valve, such as an electrically controllable valve (not shown). Thus, a high accuracy with regard to the amount of liquid being provided to the liquid layer 40 can be provided.

At least one of the liquid manipulation means 400a-f is a reagent dispensing means adapted to provide a reagent to the liquid layer.

At least one of the liquid manipulation means 400a-f is a liquid contacting means adapted to manipulate the liquid layer.

At least one of the liquid manipulation means 400a-f is a liquid dispensing means adapted to add liquid to the liquid layer 407.

At least one of the liquid manipulation means 400a-f is a liquid removal means adapted to remove liquid from the liquid layer 407.

Figure 5:
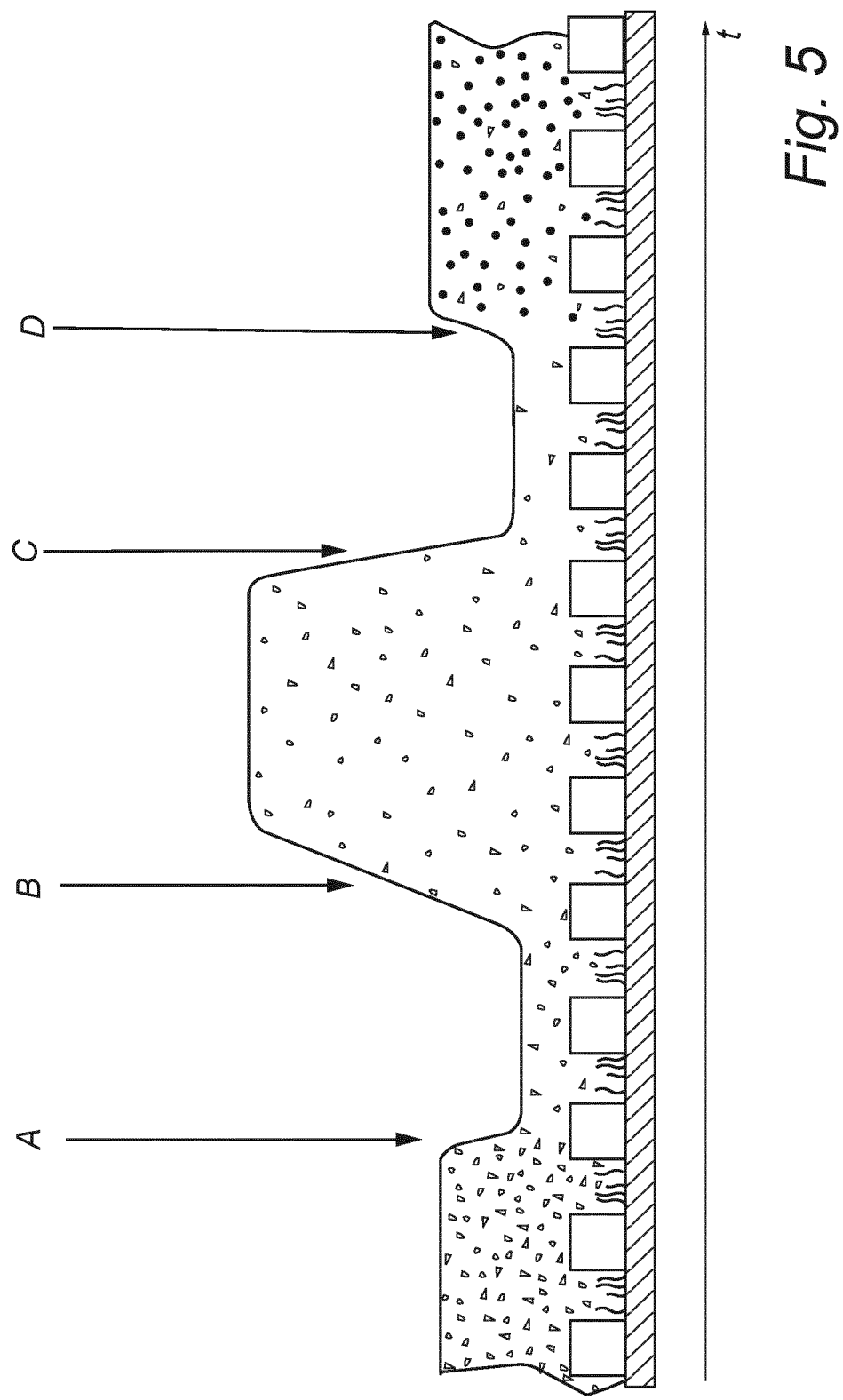
FIG. 5 shows a schematic illustration of how the thickness of the liquid layer can be varied in embodiments of the invention.

FIG. 5 shows a schematic of how the thickness of the reaction medium, i.e. the liquid layer covering the samples, in a specific sample volume can be increased and decreased over different instances in time. Initially, before instance A, the liquid layer has a high concentration of excess reactants. At point A, the liquid is either partially displaced or partially removed from the specific sample by a liquid contacting means or a liquid removal means, this means that the number of reactants in the sample volume decreases, since reactants are removed or displaced to other locations on the sample. In point B, liquid with zero concentration is added to the liquid layer via the liquid dispensing means and the remaining reactants start diffusing into the added liquid. After a while, which if the thickness of the liquid remaining after step A is in the order of a few micrometers could be in the order of 10 milliseconds, a large part of the remaining reactants have diffused into the bulk of the now thicker liquid layer. At point C, liquid is again either partially displaced by the liquid contacting means or partially removed by the liquid removal means from the specific sample volume and the number of reactants present in the specific sample volume now have been significantly reduced. Steps B and C may thereafter be repeated until the concentration of remaining reactants is sufficiently low. At step D liquid with a different reactant is added by the reagent dispensing means to enable the next reaction in the assay.

FIG. 6 schematically shows various steps in an assay cycle. Initially, i.e. before step A), the liquid layer has a virtually zero concentration of reactants. At step A) a liquid manipulating means liquid adapted to add liquid, dispenses liquid of a desired pH and temperature, containing the desired composition and concentration of reactants to the liquid layer. At the optional step B), the liquid layer is subjected to a liquid manipulating means that disperses (smears out) the liquid added at step A). Said step B) aims to ensure that every sample volume obtains the same concentration and the same liquid layer thickness. If the right target molecule or analyte is present in the sample volume, reactions between said reactants and analytes (target molecules) may occur in the sample volume, as denoted in the figure by F). The aim of the following step C), is to lower the concentration of excess reactants (reactants that did not participate in any reaction at d) but remain present in the sample volumes) to a sufficiently low level. Step C) is accomplished by using a liquid manipulation means adapted to partially displace or partially remove a portion of liquid from the sample layer. At step D) a liquid manipulating means dispenses liquid of a close to zero concentration of reactants. By repeating steps C) and D) and finish with step C) the concentration is gradually lowered to the desired level. Again, the step B) may be used to even out the surface of the liquid layer which is advantageous from an optical standpoint in the following step E). In said step E), the sample volume is illuminated and light emanating from the sample volume as a result of said illumination is detected. Light emission from the sample volume could e.g. happen if a reaction has taken place between a reactant and an analyte and a fluorescent group attached to the reactant thus still is present in the sample volume. This completes the cycle where a reaction has been detected or not.

FIG. 7 schematically depicts different examples of liquid manipulation means 700a-c. In this example, the liquid manipulation means 700a-c are stationary in relation to the rotating sample holder 711. The liquid layer 707 on the sample holder is co-rotating with the sample holder 711 and thus has a velocity when passing the liquid manipulation means 700a-c of the peripheral velocity of said sample holder 711. All liquid manipulation means 700a-c are equipped with translation stages 713a-c and rotation stages 715a-c to enable precise positioning of said liquid manipulation means in close proximity or in contact with said liquid layer 707. Such translation and rotation stages 713a-c, 150a-c may include actuators, gear wheels, or the like. The translation and/or rotation stages 713a-c, 715a-c are preferably controlled by a control unit (not shown) adapted to control the position of the liquid manipulation means. The rotation stages are used to control the angle of attack with which said liquid manipulation means interact with the liquid layer. The control unit may be communicating with a sensor or measuring device for accurately providing feedback regarding various parameters of the rotation and/or translation stages, relating for example to the position of the liquid manipulation means, the angle between the liquid contacting portion and the liquid layer, or the pressure exerted by the liquid manipulation means on the liquid layer.

Depicted at the left in the figure is a liquid manipulation means 700a that is adapted to remove a portion S of liquid from the liquid layer. The liquid manipulation means comprises a liquid contacting portion 705a, shown herein as a flexible blade that a sharp shedding edge that when immersed into the liquid layer 707, due to the relative motion of the liquid in the liquid layer and the liquid contacting portion 705a, separates the liquid into a shed part S that is redirected away from the liquid layer and a remaining part R that stays on the rotating sample holder 711. The redirected liquid is captured in an inlet 703a or orifice in liquid communication with a liquid channel 701a.

Depicted in the center of the figure is a liquid manipulation means 700b that is adapted to dispense (add) a portion of liquid to the liquid layer 707 of the sample holder. Liquid is fed via a liquid channel 701b to an outlet 704b. Preferably, the flow of the liquid is regulated such that when the liquid leaves the outlet its velocity vector in the peripheral direction coincides with the peripheral velocity of the rotating sample holder. That way the added liquid stays in the position on the circumference of the sample holder where it was dispensed. The amount of dispensed liquid may be determined by a liquid control means, such as a controllable valve.

Depicted at the right of the figure is a liquid manipulation means 700c that is adapted to displace or disperse liquid from one position on the sample holder to another. The liquid manipulation means comprises a liquid contacting portion 705c that slides on the liquid layer 707 while forming a droplet in front of the liquid contacting portion 705c. In this example the liquid contacting portion comprises a brush 705c with bristles 706c. The brush is in liquid contact with a liquid channel 701c. The purpose of the liquid channel is to, through the capillary action of the bristles 706c, being able to feed the brush with liquid of zero concentration of reactants, such that only the very outer end of the brush absorbs liquid from the liquid layer. This way only the outer tip of the brush is contaminated with reactants and thus can be rinsed quickly between usage.

FIG. 8 shows in more detail a liquid manipulation means that is adapted to remove a portion of liquid from the liquid layer. A liquid contacting portion 805 with of a curved blade with an edge 806 is immersed into the liquid layer 807 and the relative motion of the liquid in the liquid layer 807 and the liquid contacting portion, separates the liquid into a shed part S that is redirected away from the liquid layer by the blade and a remaining part R that stays on the rotating sample holder. The function of the liquid contacting portion 805 resembles that of a cutting tool in a lathe. The shape of the liquid contacting portion 805 is chosen such that the shed liquid S is guided with minimal interruption to an orifice or inlet 803 in fluid connection with a liquid channel 801. This is like how the rake angle is chosen in a traditional cutting tool. The shape of the side of the liquid contacting portion 805 facing against the rotating sample holder 811, is chosen with a round shape to avoid sudden pressure changes in the liquid remaining on said sample holder. This is to avoid cavitation in the liquid remaining on the sample holder. Cavitation may otherwise damage the samples. By creating an under-pressure in the liquid channel 801, for example by means of a pump connected to the liquid channel, shed liquid S captured in the orifice can be further transported to a vessel for subsequent recycling or disposal. The figure also outlines the sample holder 811a provided with a metal layer 814. On top of said metal layer, sample volumes 810 have been defined by patterns of photoresist and samples in the formed groves have been immobilized in said grooves by prior functionalization of the surface of the bare parts of the metal layer.

Also in this example, the liquid manipulation means comprises translation means 813 and rotation means 815, such as described above.

FIG. 9 schematically depicts the liquid manipulation means 900 adapted to remove liquid from another perspective. The liquid contacting portion 905 has an edge 906 that that has a certain width in the direction that roughly coincides with the direction of the rotational axis of the rotating sample holder. This way liquid can be partially removed from a whole section of the sample holder. This width could be as small as tenths of microns, but it may also be in the order of centimeters. The shape of the side of the liquid contacting portion 905 facing outwards from the rotating sample holder is designed to guide the shed liquid towards an inlet 904 connected to a liquid channel 901.

FIG. 10 schematically shows a schematic view of the apparatus 1000 according to an embodiment of the invention. In the schematic, a liquid layer 1007 is provided on the sample holder 1011. In liquid contact with the liquid layer, there is provided a liquid contacting portion 1005, depicted herein as a plate-like element.

A first portion, proximal portion 1005a of the plate-like element is provided with a liquid inlet 1004 in liquid connection with a liquid channel 1001a. The liquid inlet is preferably provided with an under-pressure, such that liquid from the liquid layer 1007 can be guided from the liquid layer 1007 to the liquid inlet, such that liquid can be removed from the liquid layer 1007. The under-pressure may be provided by a pump (not shown) connected to the liquid channel 1001a. In the depicted embodiment, the liquid inlet 1004 and liquid channel 1001a forms part of a fluid removal means 1013 capable of removing liquid from the liquid layer.

On a second, distal end 1005b of the plate-like element 1005, there is provided a liquid outlet 1003 in liquid connection with the liquid channel 1001b. The liquid outlet is configured to dispense liquid to the rotating sample holder such that the amount of liquid and/or the thickness of the liquid layer 1007 can be increased. The liquid outlet 1003 may be provided with at least one valve configured to control the amount of liquid being dispensed to the liquid layer.

The plate-like element 1005 is attached to a support structure 1025, which comprises a flexible portion 1022 acting as a force controlling element, depicted herein in the form two pistons 1022a movably attached in a housing 1022b. The force controlling element is configured to contract and retract upon application and release of a force, respectively. It is equally conceivable that flexible portion 1022 could comprise at least one spring. The structure 1025 is attached to a housing of the apparatus via the flexible portions 1022. To not complicate the figure, this connection is not shown, but can be achieved by means known to a person skilled in the art. When a force from the liquid layer 1007 is applied on the plate-like element, the flexible portion will contract a predetermined amount, depending on the force, such that the plate-like element 1005 is moved a distance from the surface of the sample holder 1011. In examples where the flexible portion comprises a spring, the spring force will determine how much the spring will compress at a given applied force from the liquid layer 1007. The force applied by the fluid layer is dependent on the rotational velocity of the sample holder 1011 and the amount of liquid present in the liquid layer 1007. The flexible portions 1022 and the connections between the liquid channel and the support structures may be protected by gaiters 1030a-d.

The provision of the flexible portion 1022 allows for the formation of a self-regulating thickness of the liquid layer. If, for example a first sample holder 1111 is replaced by a second sample holder with a larger diameter, for example for replacing the samples, the flexible portion 1022 allows for the formation of an equally thick liquid layer 1007 as formed with the first sample holder.

During operation, when the sample holder 1011 is rotating, said plate-like element 1005 slides against the liquid layer with a flat surface against the liquid layer. The liquid contacting portion 1005 should preferably be positioned such that a meeting line L defined by the closest distance between cylinder surface and the essentially flat surface of said plate-like element, is closer to the center of said plate-like element than the edges of said plate-like element. By placing said liquid inlet 1004 where the liquid layer 1007 is compressed by the liquid contacting portion 1005, i.e. before the liquid layer passes said meeting line L, the positive pressure gradient caused by the shear forces created by the relative motion between said liquid contacting portion and the cylindrical sample holder will push liquid into the inlet 1004 and the liquid can thus be removed from the liquid layer 1007 and the thickness of the liquid layer 1007 decreases. At the same time, if the outlet 1003 is placed after the meeting line, liquid can be added through said inlet in a way that resembles a venturi ejector pump. By controlling the flow through the liquid channels connected to the inlets and outlets, respectively, the liquid layer thickness can be regulated. The dimensions of said plate-like element will vary depending on application but the width of the contacting portion of the said element, that is the width of the element in physical contact with the liquid layer is preferably wider than the field of view (FOV) of the imaging system. The length should be at least long enough to give room to at least one orifice on both sides of the meeting line. To move the liquid contacting portion 1005 at different positions along the rotational axis of the sample holder 1011, the support structure 1025 may comprises means to effect relative translation of said liquid manipulating means. By translating the liquid contacting portion 1005 in a direction substantially perpendicular to the direction defined by the rotational axis of the sample holder 1011 the inlet 1004 may be moved out of or into contact with the liquid layer 1007. When the inlet does not contact the liquid layer the liquid contacting portion may be used for liquid distribution, i.e. to redistribute and/or change a thickness of the liquid layer without removal of liquid from the liquid layer. The flexible connection of the liquid contacting portion 1005 with the support structure 1025 may provide for a self-regulation of the thickness of the liquid layer. A flow of liquid adapted to compensate for loss of liquid from the liquid layer, e.g. by evaporation, may be supplied via the liquid outlet 1003. The added liquid will be distributed by the liquid contact portion such that the resulting thickness balance the force exerted by the flexible connection.

As illustrated in the present figure, the plate-like element 1005 may comprise a first surface arranged to face the liquid layer, a second surface opposing the first surface, and an orifice provided at the first surface. In the present example, the orifice is represented by the outlet 1003 and the inlet 1004. Further, a passage may be provided between the first and second surfaces, allowing a fluid communication to be formed between a liquid channel, such as the first or second liquid channels 1001a, 1001b and the orifice.

The outlet 1003 and the liquid channel 1001b are comprised in the liquid dispensing means 1015 capable of adding liquid to the surface of the sample holder 1011. The liquid outlet 1003 is connected to the liquid channel 1001b via the passage through the plate-like element, such that the liquid outlet 1003 is capable of receiving liquid from the channel and adding it to the surface of the liquid layer. The liquid outlet 1003 may also be adapted to function as a nozzle such that liquid can be sprayed onto the surface of the sample holder. Preferably, the liquid dispensing means 1015 comprises at least one valve adapted to control the amount of liquid being provided to the sample holder 1007.

The liquid may be dispensed through the liquid outlet 1003 to the rotating surface with a flow vector directed at a small angle relative to the tangent of said surface. The velocity of the liquid when leaving the liquid outlet 1003 is suitably chosen such that it coincides with a peripheral velocity of said surface of the rotating sample holder 1011. This way, the liquid deposited on the rotating surface stays in the location where it was deposited. Once the liquid is added to the sample holder it is typically unevenly distributed and needs to be redistributed or smeared out to cover every desired location of the sample layer. The liquid contacting portion 1005 of said liquid manipulating means may be used to redistribute and/or change a thickness of liquid layer, as well as controlling which areas of the sample layers that are covered with liquid.

FIG. 11 shows a schematic view of the apparatus 1100 according to an embodiment of the invention. In the schematic, a liquid layer 1107 is provided on the cylindrical sample holder 1111, which is rotatably arranged in the apparatus around its longitudinal axis. In liquid contact with the liquid layer, there is provided a liquid contacting portion, depicted herein as a plate-like element 1105. The plate-like element 1105 is flexibly assembled in a device housing. The flexible assembly is achieved in that the plate-like element 1105 is attached to a flexible portion 1122, which in turn is attached to the device housing. The flexible portion 1122 may for example be a spring.

The apparatus is further provided with a liquid dispensing means 1115 capable of adding liquid to the surface of the sample holder 1111. The liquid dispensing means could also be used for providing reagents to the liquid layer, in which case the liquid dispensing means doubles as a reagent dispensing means.

The dispensing means 1115 is arranged to add liquid to the surface of the sample holder 1111. Preferably, the liquid dispensing means 1115 comprises at least one valve adapted to control the amount of liquid 1140 being provided to the sample holder 1111. The liquid may be dispensed through the liquid dispensing means 1115 to the rotating surface with a flow vector directed at a small angle relative to the tangent of said surface. The velocity of the liquid when leaving the liquid dispensing means 1115 is suitably chosen such that it coincides with a peripheral velocity of said surface of the rotating sample holder 1111. In this way, the liquid deposited on the rotating surface stays in the location where it was deposited. Once the liquid is added to the sample holder it is typically unevenly distributed and needs to be redistributed or smeared out to cover every desired location of the sample layer. The plate-like element 1105 of said liquid manipulating means may be used to redistribute and/or change a thickness of liquid layer, as well as controlling which areas of the sample holder that are covered with liquid. The plate-like element 1105 may furthermore be arranged so that liquid droplets dispensed from the liquid dispensing means 1115 that do not adhere to the sample holder but rather bounce off are redirected back towards the sample holder.

When a force from the liquid layer 1107 is applied to the plate-like element, the flexible portion will contract, the amount of contraction being dependent on the thickness of the liquid layer and the rotation of the sample holder, such that the plate-like element 1105 is moved a distance from the surface of the sample holder 1111. In examples where the flexible portion comprises a spring, the spring force will determine how much the spring will compress at a given applied force from the liquid layer 1107. The force applied by the liquid layer is dependent on the rotational velocity of the sample holder 1111 and the amount of liquid present in the liquid layer 1107. Preferably, the spring force is small as compared to the capillary forces acting on the plate-like element 1105 such that the thickness of the liquid layer 1107 is mainly determined by a balance between surface tension and lubrication pressure while the spring force mainly acts to ensure that there is contact between the liquid layer 1107 and the plate-like element 1105.

The provision of the flexible portion 1122 allows for the formation of a self-regulating thickness of the liquid layer. If, for example a first sample holder 1111 is replaced by a second sample holder with a larger diameter, for example for replacing the samples, the flexible portion 1122 allows for the formation of an equally thick liquid layer 1107 as formed with the first sample holder. Achieving an equally thick liquid layer with a liquid contacting portion that is fixedly assembled would place extreme requirements on manufacturing tolerances on the sample holder, especially so when the desired thickness of the liquid layer is in the range of a few μm, The apparatus 1100 may further be provided with a liquid removal means, as described in relation to any one of the FIGS. 1-10.

While the invention has been described with reference to various exemplary embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the particular embodiment disclosed as the best mode contemplated for carrying out this invention, but that the invention will include all embodiments falling within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. An apparatus for conducting assays on samples and/or processing of samples, said apparatus comprising:
 a cylindrical sample holder for holding a sample at a lateral surface of the cylindrical sample holder, wherein said cylindrical sample holder is rotatably arranged; wherein said cylindrical sample holder is configured to be at least partly covered by a liquid layer;
 a liquid dispensing means configured to add liquid to the liquid layer, wherein the liquid dispensing means is connected to a first container for holding the liquid;
 a reagent dispensing means configured to add a reagent to the liquid layer, wherein the reagent dispensing means is connected to a second container for holding the reagent;
  a liquid contacting means configured to distribute liquid within said liquid layer, wherein said liquid contacting means comprises a plate-like element having a substantially flat surface adapted to contact the liquid layer, the plate like element being flexibly assembled in relation to the cylindrical sample holder, such that the plate-like element can be arranged at a first predetermined distance from the cylindrical sample holder when no external forces are acting on the plate-like element, and at a second, larger distance from the cylindrical sample holder when the liquid layer is exerting a force on the plate-like element upon rotation of the cylindrical sample holder, wherein the plate-like element is attached to a force controlling element configured to control the amount of force that the plate-like element exerts on the liquid layer, wherein the force controlling element comprises a flexible portion configured to be contracted upon application of a force from the liquid layer upon rotation of the cylindrical sample holder, thereby increasing the distance between the plate-like element and the sample holder as long as the force is applied.

2. The apparatus according to claim 1, wherein said plate-like element comprises at least one orifice configured to at least one of
 dispensing liquid to the liquid layer; and
 removing liquid from the liquid layer; and wherein the at least one orifice is in fluid communication with a liquid channel configured to at least one of
 transporting fluid to the orifice, and
 transporting fluid from the orifice.

3. The apparatus according to claim 2, wherein said plate-like element comprises:
 a first surface configured to face the liquid layer;
 a second surface opposing the first surface; and
 a passage extending between the first surface and the second surface;
 wherein said at least one orifice is arranged at the first surface; and
 wherein the passage is arranged to provide the fluid communication between the orifice and the liquid channel.

4. The apparatus according to any one the preceding claims, wherein the apparatus further comprises a mixing tool arranged to induce mixing in said liquid layer.

5. The apparatus according to claim 4, wherein the mixing tool comprises at least one of
 a brush;
 a plate like element comprising a least one ridge;
 a plate like element comprising at least one pillar.

6. The apparatus according to any one of the preceding claims, further comprising
 illumination means for illuminating said sample;
 an objective for collecting photons emitted or scattered from the sample; and
 detection means for detecting photons collected by the objective;
 wherein optical contact between the objective and the sample is provided at least partly by the liquid layer.

7. The apparatus according to any one of the preceding claims further comprising means for measuring a quantity indicative of a concentration of said reagent in said liquid layer.

8. A method in an apparatus for conducting an assay on samples and/or processing a sample, said method comprising the steps:
 a) arranging a cylindrical sample holder in the apparatus;
 b) providing at least one sample to be studied on the sample holder;
 c) providing liquid of a first type to the sample holder,
 d) distributing said liquid to form a liquid layer having a uniform thickness over at least one circumference on said cylindrical sample holder by arranging a plate-like element, flexibly assembled in relation to the cylindrical sample holder, such that the plate-like element can be arranged at a first predetermined distance from the cylindrical sample holder when no external forces are acting on the plate-like element, and at a second, larger distance from the cylindrical sample holder when the liquid layer is exerting a force on the plate-like element upon rotation of the cylindrical sample holder, and wherein the plate-like element is attached to a force controlling element configured to be contracted upon application of a force from the liquid layer upon rotation of the cylindrical sample holder, thereby increasing the distance between the plate-like element and the sample holder as long as the force is applied, and rotating the cylindrical sample holder around a longitudinal axis;
 e) providing a reagent to said liquid layer;
 f) allowing at least one desired reaction to take place between said reactant and said at least one sample;
 g) removing liquid from the liquid layer of the cylindrical sample holder arranged in the apparatus.

9. The method according to claim 8, further comprising a step h) illuminating said sample and detecting photons emitted or scattered from said sample.

10. The method according to claim 8 or 9, wherein the method further comprises a step g1) diluting the reagent concentration in the liquid layer by adding liquid of said first type to the liquid layer.

11. The method according to any one of claims 8-10, further comprising a step e1) increasing the reagent concentration in the liquid layer by evaporating liquid from the liquid layer.

12. The method according to any of claim 8-11, further comprising a step of inducing mixing in the liquid layer, in order to even out the concentration of reagents in the liquid layer.

13. The method according to any one of claims 8-12, further comprising a step of regulating the temperature of the liquid layer to a first predetermined temperature.

14. The method according to any one of claims 8-13, wherein the steps following steps a) and b) are performed during rotation of the sample holder.

15. The method according to any one of claims 8-13, wherein said step of removing liquid is performed when the sample holder is stationary.

16. The method according to any one of claims 8-15, wherein step d) further comprises controlling the thickness of the liquid layer by arranging a plate-like element, flexibly assembled in relation to the cylindrical sample holder, in liquid contact with the liquid layer.

\* \* \* \* \*

UNITED STATES PATENT AND TRADEMARK OFFICE
CERTIFICATE OF CORRECTION

PATENT NO. : 12,044,693 B2
APPLICATION NO. : 18/548794
DATED : July 23, 2024
INVENTOR(S) : Strömqvist et al.

It is certified that error appears in the above-identified patent and that said Letters Patent is hereby corrected as shown below:

On the Title Page

Item (54) and in the Specification Column 1, Lines 3-4, delete "MEANS WITH FORCE CONTROLLING".

Item (54) and in the Specification Column 1, Line 4, after "ELEMENT" insert -- WITH FORCE CONTROL --.

In the Claims

In Column 25, Claim 1, Line 31, after "reagent;" insert -- and --.

In Column 25, Claim 1, Line 47, delete "the amount" and insert -- an amount --, therefor.

In Column 25, Claim 1, Line 53, after "and the" insert -- cylindrical --.

In Column 25, Claim 2, Line 57, delete "of" and insert -- of: --, therefor.

In Column 25, Claim 2, Line 58, delete "dispensing" and insert -- dispense --, therefor.

In Column 25, Claim 2, Line 58, delete "and" and insert -- or --, therefor.

In Column 25, Claim 2, Line 59, delete "removing" and insert -- remove --, therefor.

In Column 25, Claim 2, Line 59, delete "wherein" and insert -- wherein: --, therefor.

In Column 25, Claim 2, Line 61, delete "of" and insert -- of: --, therefor.

In Column 25, Claim 2, Line 62, delete "transporting" and insert -- transport --, therefor.

Signed and Sealed this
Twenty-second Day of October, 2024

Katherine Kelly Vidal
*Director of the United States Patent and Trademark Office*

CERTIFICATE OF CORRECTION (continued)
U.S. Pat. No. 12,044,693 B2

In Column 25, Claim 2, Line 62, after "to the" insert -- at least one --.

In Column 25, Claim 2, Line 62, delete "and" and insert -- or --, therefor.

In Column 25, Claim 2, Line 63, delete "transporting" and insert -- transport --, therefor.

In Column 25, Claim 2, Line 63, after "from the" insert -- at least one --.

In Column 26, Claim 3, Line 2, delete "surface;" and insert -- surface, --, therefor.

In Column 26, Claim 3, Line 4, delete "surface;" and insert -- surface, --, therefor.

In Column 26, Claim 3, Line 6, after "between the" insert -- at least one --.

In Column 26, Claim 4, Lines 8-9, delete "any one the preceding claims," and insert -- claim 1, --, therefor.

In Column 26, Claim 5, Line 12, delete "of" and insert -- of: --, therefor.

In Column 26, Claim 5, Line 15, after "ridge;" insert -- or --.

In Column 26, Claim 6, Lines 17-18, delete "any one of the preceding claims," and insert -- claim 1, --, therefor.

In Column 26, Claim 6, Line 18, delete "comprising" and insert -- comprising: --, therefor.

In Column 26, Claim 6, Line 19, delete "illumination" and insert -- an illumination --, therefor.

In Column 26, Claim 6, Line 22, delete "detection" and insert -- a detection --, therefor.

In Column 26, Claim 7, Lines 26-27, delete "any one of the preceding claims," and insert -- claim 1, --, therefor.

In Column 26, Claim 7, Line 27, after "comprising" insert -- a --.

In Column 26, Claim 8, Line 32, delete "steps:" and insert -- steps of: --, therefor.

In Column 26, Claim 8, Line 34, after "on the" insert -- cylindrical --.

In Column 26, Claim 8, Line 36, after "to the" insert -- cylindrical --.

In Column 26, Claim 8, Line 52, delete "the distance" and insert -- a distance --, therefor.

In Column 26, Claim 8, Line 53, delete "the sample holder" and insert -- the cylindrical sample holder --, therefor.

CERTIFICATE OF CORRECTION (continued)
U.S. Pat. No. 12,044,693 B2

In Column 26, Claim 8, Line 58, delete "reactant" and insert -- reagent --, therefor.

In Column 26, Claim 8, Line 58, after "sample;" insert -- and --.

In Column 26, Claim 10, Line 64, delete "8 or 9," and insert -- 8, --, therefor.

In Column 26, Claim 10, Lines 65-66, delete "the reagent concentration" and insert -- a concentration of the reagent --, therefor.

In Column 27, Claim 11, Line 1, delete "any one of claims 8-10," and insert -- claim 8, --, therefor.

In Column 27, Claim 11, Lines 2-3, delete "the reagent concentration" and insert -- a concentration of the reagent --, therefor.

In Column 27, Claim 12, Line 5, delete "any one of claims 8-11," and insert -- claim 8, --, therefor.

In Column 27, Claim 12, Line 7, delete "the concentration" and insert -- a concentration --, therefor.

In Column 27, Claim 13, Line 9, delete "any one of claims 8-12," and insert -- claim 8, --, therefor.

In Column 27, Claim 13, Line 10, delete "the" and insert -- a --, therefor.

In Column 27, Claim 14, Line 12, delete "any one of claims 8-13," and insert -- claim 8, --, therefor.

In Column 27, Claim 14, Line 14, after "the" insert -- cylindrical --.

In Column 27, Claim 15, Line 15, delete "any one of claims 8-13," and insert -- claim 8, --, therefor.

In Column 27, Claim 15, Line 16, after "the" insert -- cylindrical --.

In Column 27, Claim 16, Line 18, delete "any one of claims 8-15," and insert -- claim 8, --, therefor.